US012260828B2

(12) United States Patent
Park et al.

(10) Patent No.: US 12,260,828 B2
(45) Date of Patent: Mar. 25, 2025

(54) GATE DRIVING CIRCUIT AND DISPLAY DEVICE

(71) Applicant: LG Display Co., Ltd., Seoul (KR)

(72) Inventors: Jaesung Park, Paju-si (KR); Kwangsoo Kim, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/508,340

(22) Filed: Nov. 14, 2023

(65) Prior Publication Data

US 2024/0185799 A1 Jun. 6, 2024

(30) Foreign Application Priority Data

Dec. 5, 2022 (KR) ........................ 10-2022-0168037

(51) Int. Cl.
*G09G 3/3266* (2016.01)

(52) U.S. Cl.
CPC ... *G09G 3/3266* (2013.01); *G09G 2300/0408* (2013.01); *G09G 2310/0291* (2013.01)

(58) Field of Classification Search
CPC ......... G09G 3/3266; G09G 2300/0408; G09G 2310/0291; G09G 2310/0286; G09G 2320/0295; G09G 3/3677; G09G 2310/0202; G09G 2310/0267; G09G 2310/08; G09G 2330/021; H10K 59/131
See application file for complete search history.

(56) References Cited

U.S. PATENT DOCUMENTS

| | | | | |
|---|---|---|---|---|
| 11,367,379 | B1 * | 6/2022 | Park | G09G 3/3266 |
| 2013/0100007 | A1 | 4/2013 | Yamamoto et al. | |
| 2013/0222357 | A1 | 8/2013 | Tseng et al. | |
| 2015/0206488 | A1 | 7/2015 | Zhang et al. | |
| 2018/0337682 | A1 * | 11/2018 | Takasugi | H03K 21/18 |
| 2019/0043405 | A1 * | 2/2019 | Noh | G09G 3/3674 |
| 2019/0096333 | A1 | 3/2019 | Park et al. | |
| 2021/0201770 | A1 * | 7/2021 | Park | G11C 19/28 |
| 2021/0201816 | A1 * | 7/2021 | Kim | G09G 3/3266 |
| 2021/0210019 | A1 * | 7/2021 | Han | G09G 3/3291 |
| 2022/0190093 | A1 * | 6/2022 | No | G09G 3/3607 |
| 2022/0208104 | A1 | 6/2022 | Chang et al. | |

FOREIGN PATENT DOCUMENTS

| | | | |
|---|---|---|---|
| JP | 2006003889 | A | 1/2006 |
| JP | 2013174876 | A | 9/2013 |
| JP | 2015161945 | A | 9/2015 |
| JP | 2015194577 | A | 11/2015 |
| TW | 201717178 | A | 5/2017 |
| TW | 202248979 | A | 12/2022 |

* cited by examiner

*Primary Examiner* — Premal R Patel
(74) *Attorney, Agent, or Firm* — Seed IP Law Group LLP

(57) ABSTRACT

Disclosed herein are a gate driving circuit having a small-area structure and a display device, and more specifically, each of a plurality of stage circuits included in the gate driving circuit includes a sensing part, a logic part, and a buffer group, first to fourth scan clock signals and a first carry clock signal are electrically connected to a first stage circuit, and fifth to eighth scan clock signals and a second carry clock signal are electrically connected to a second stage circuit.

16 Claims, 13 Drawing Sheets

ST n

ST k

GATE DRIVING CIRCUIT AND DISPLAY DEVICE

CROSS REFERENCE TO RELATED APPLICATION

This application claims priority from Korean Patent Application No. 10-2022-0168037, filed on Dec. 5, 2022, which is hereby incorporated by reference for all purposes as if fully set forth herein.

BACKGROUND

Technical Field

Embodiments of the present disclosure relate to a gate driving circuit and a display device.

Description of the Related Art

As the information society develops, the demand for display devices for displaying images is increasing in various forms, and recently, various display devices such as liquid crystal display devices and organic light emitting display devices are being used.

To display an image, a display device includes a display panel on which a plurality of data lines and a plurality of gate lines are disposed, a data driving circuit for outputting data signals through the plurality of data lines, and a gate driving circuit for outputting gate signals through the plurality of gate lines.

The display panel may include a display area in which an image is displayed and a bezel area in which an image is not displayed. When the display area is increased and the bezel area is reduced, a compact display device can be provided.

The gate driving circuit may be electrically connected to a plurality of signal lines disposed in the bezel area. As the number of signal lines disposed in the bezel area is reduced, a compact display device can be provided.

BRIEF SUMMARY

As signal lines disposed in a bezel area are increased, there is a problem in that it is difficult to reduce the bezel area.

An aspect of the present disclosure is to provide a gate driving circuit with a small-area structure and a display device.

In an aspect, embodiments of the present disclosure provides a gate driving circuit including a plurality of stage circuits electrically connected to a plurality of clock signal lines and configured to output a plurality of scan signals and a plurality of carry signals, wherein the plurality of clock signal lines include first to eighth scan clock signal lines and first and second carry clock signal lines, each of the plurality of stage circuits includes a buffer group configured to output the plurality of scan signals and the plurality of carry signals, a logic part configured to control the buffer group during a display driving period for driving an image, and a sensing part configured to control the buffer group during a sensing driving period for sensing a characteristic value of a sub-pixel, and the plurality of stage circuits include a first stage circuit electrically connected to the first to fourth scan clock signal lines and the first carry clock signal line, a second stage circuit electrically connected to the fifth to eighth scan clock signal lines and the second carry clock signal line, and a third stage circuit electrically connected to the first to fourth scan clock signal lines and the first carry clock signal line.

In another aspect, embodiments of the present disclosure provides a display device including a display panel including a plurality of scan lines and a plurality of sub-pixels, and a gate driving circuit disposed in a non-display area of the display panel and configured to drive the plurality of scan lines, wherein the gate driving circuit includes a plurality of stage circuits that are electrically connected to the plurality of clock signal lines and output a plurality of scan signals and a plurality of carry signals, the plurality of clock signal lines include first to eighth scan clock signal lines and first and second carry clock signal lines, each of the plurality of stage circuits includes a buffer group configured to output the plurality of scan signals and the plurality of carry signals, a logic part configured to control the buffer group during a display driving period for driving an image, and a sensing part configured to control the buffer group during a sensing driving period for sensing characteristic values of a plurality of sub-pixels, and the plurality of stage circuits include a first stage circuit electrically connected to the first to fourth scan clock signal lines and the first carry clock signal line, a second stage circuit electrically connected to the fifth to eighth scan clock signal lines and the second carry clock signal line, and a third stage circuit electrically connected to the first to fourth scan clock signal lines and the first carry clock signal line.

In still another aspect, embodiments of the present disclosure provides a display device including a plurality of scan lines, a plurality of clock signal lines including first to eighth scan clock signal lines and first and second carry clock signal lines, a gate driving circuit electrically connected to the plurality of clock signal lines and configured to drive the plurality of scan lines, wherein the gate driving circuit and the plurality of clock signal lines are disposed in a non-display area, the gate driving circuit includes a plurality of stage circuits that are electrically connected to the plurality of clock signal lines and output a plurality of scan signals and a plurality of carry signals, each of the plurality of stage circuits includes a buffer group configured to output the plurality of scan signals and the plurality of carry signals, a logic part configured to control the buffer group during a display driving period for driving an image, and a sensing part configured to control the buffer group during a sensing driving period for sensing a characteristic value of a sub-pixel, the plurality of stage circuits include a first stage circuit, a second stage circuit, and a third stage circuit, the first to fourth scan clock signal lines and the first carry clock signal line are electrically connected to the first stage circuit and the third stage circuit, and the fifth to eighth scan clock signal lines and the second carry clock signal line are electrically connected to the second stage circuit.

In yet another aspect, embodiments of the present disclosure may provide a gate driving circuit including a plurality of stage circuits electrically connected to a plurality of clock signal lines and configured to output a plurality of scan signals and a plurality of carry signals, wherein the plurality of clock signal lines include first to eighth scan clock signal lines and first and second carry clock signal lines, each of the plurality of stage circuits includes a buffer group configured to output the plurality of scan signals and the plurality of carry signals, a logic part configured to control the buffer group during a display driving period for driving an image, and a sensing part configured to control the buffer group during a sensing driving period for sensing a characteristic value of a sub-pixel, the plurality of stage circuits include a $(2n-1)^{th}$ stage circuit electrically connected to the first to fourth scan clock signal lines and the first carry clock signal line, and a $2n^{th}$ stage circuit electrically connected to the fifth to eighth scan clock signal lines and the second carry clock signal line, and n is a natural number that is one or more.

According to embodiments of the present disclosure, a gate driving circuit having a small-area structure, a display panel, and a display device can be provided.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which.

DETAILED DESCRIPTION

Figure 1:
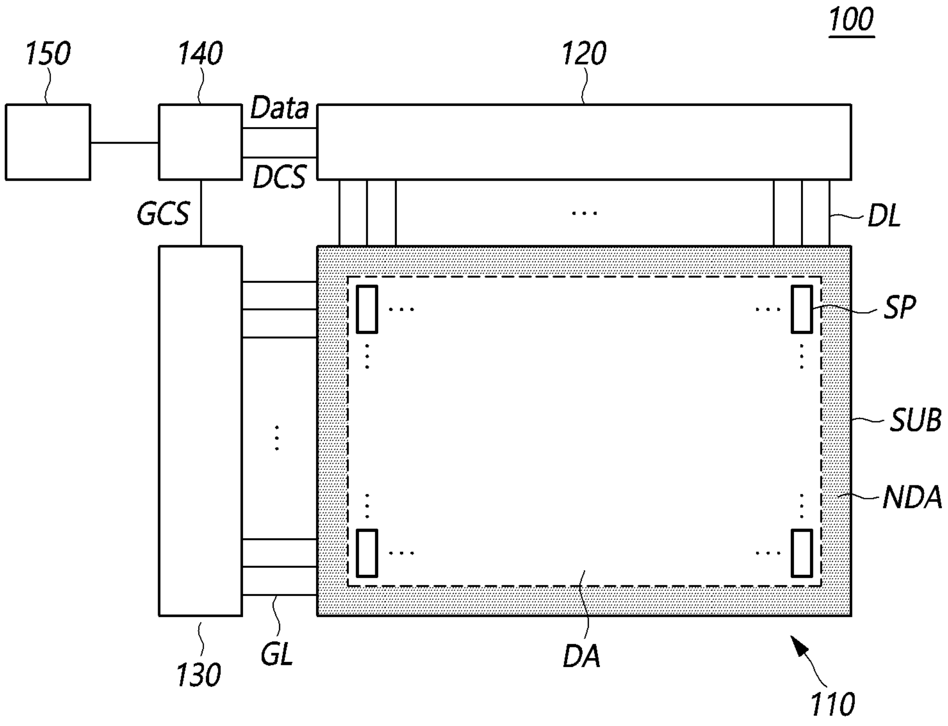
FIG. 1 is a block diagram illustrating a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as “including,” “having,” “containing,” “constituting,” “make up of,” and “formed of” used herein are generally intended to allow other components to be added unless the terms are used with the term “only.” As used herein, singular forms are intended to include plural forms unless the context clearly indicates otherwise.

Terms, such as “first,” “second,” “A,” “B,” “(A),” or “(B)” may be used herein to describe elements of the present disclosure. Each of these terms is not used to define essence, order, sequence, or number of elements, etc., but is used merely to distinguish the corresponding element from other elements.

When it is mentioned that a first element “is connected or coupled to,” “contacts or overlaps,” etc., a second element, it should be interpreted that, not only can the first element “be directly connected or coupled to” or “directly contact or overlap” the second element, but a third element can also be “interposed” between the first and second elements, or the first and second elements can “be connected or coupled to,” “contact or overlap,” etc., each other via a fourth element. Here, the second element may be included in at least one of two or more elements that “are connected or coupled to,” “contact or overlap,” etc., each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can.”

Hereinafter, various embodiments of the present disclosure will be described in detail with reference to the accompanying drawings.

FIG. 1 is a block diagram illustrating a display device 100 according to embodiments of the present disclosure.

Referring to FIG. 1, the display device 100 according to embodiments of the present disclosure may include a display panel 110 and a driving circuit for driving the display panel 110.

The driving circuit may include a data driving circuit 120 and a gate driving circuit 130 and further include a controller 140 for controlling the data driving circuit 120 and the gate driving circuit 130.

The display panel 110 may include a substrate SUB and signal lines including a plurality of data lines DL and a plurality of gate lines GL, which are disposed on the substrate SUB. The display panel 110 may include a plurality of sub-pixels SP connected to the plurality of data lines DL and the plurality of gate lines GL.

The display panel 110 may include a display area DA in which an image is displayed and a non-display area NDA in which an image is not displayed. In the display panel 110, the plurality of sub-pixels SP for displaying an image may be disposed in the display area DA, and in the non-display area NDA, the driving circuits 120, 130, and 140 may be electrically connected or may be mounted and a pad to which an integrated circuit or a printed circuit is connected may be disposed.

The data driving circuit 120 is a circuit for driving the plurality of data lines DL and may supply data signals to the plurality of data lines DL. The gate driving circuit 130 is a circuit for driving the plurality of gate lines GL and may supply gate signals to the plurality of gate lines GL. In order to control an operation timing of the data driving circuit 120, the controller 140 may supply a data control signal DCS to the data driving circuit 120. The controller 140 may supply a gate control signal GCS for controlling an operation timing of the gate driving circuit 130 to the gate driving circuit 130.

The controller 140 may start a scan according to a timing implemented in each frame, convert externally input input image data according to a data signal format used in the data driving circuit 120 to supply the converted image data Data to the data driving circuit 120, and control data driving according to the scan at an appropriate point of time.

The controller 140 receives, together with the input image data, various timing signals including a vertical synchronization signal VSYNC, a horizontal synchronization signal HSYNC, an input data enable signal DE, and a clock signal CLK from an external component (e.g., a host system 150).

In order to control the data driving circuit 120 and the gate driving circuit 130, the controller 140 may receive the timing signals such as the vertical synchronization signal VSYNC, the horizontal synchronization signal HSYNC, the input data enable signal (DE), and the clock signal CLK and generate and output various control signals DCS and GCS to the data driving circuit 120 and the gate driving circuit 130.

For example, in order to control the gate driving circuit 130, the controller 140 may output various gate control signals GCS including a gate start pulse GSP, a gate shift clock GSC, and a gate output enable signal GOE.

In addition, in order to control the data driving circuit 120, the controller 140 may output various data control signals DCS including a source start pulse SSP, a source sampling clock SSC, and a source output enable signal SOE.

The controller 140 may be implemented as a separate component from the data driving circuit 120 or integrated with the data driving circuit 120 to be implemented as a single integrated circuit.

The data driving circuit 120 receives the image data Data from the controller 140 and supplies data voltages to the plurality of data lines DL, thereby driving the plurality of data lines DL. Here, the data driving circuit 120 is referred to as a source driving circuit.

The data driving circuit 120 may include one or more source driver integrated circuits SDIC.

Each source driver integrated circuit SDIC may include a shift register, a latch circuit, a digital-analog converter (DAC), and an output buffer. In some cases, each source driver integrated circuit SDIC may further include an analog-digital converter (ADC).

For example, each source driver integrated circuit SDIC may be connected to the display panel 110 by a tape automated bonding (TAB) method, may be connected to a bonding pad of the display panel 110 by a chip on glass (COG) or chip on panel (COP) method, or may be implemented in a chip on film (COF) method to be connected to the display panel 110.

The gate driving circuit 130 may output a gate signal of a turn-on level voltage or a gate signal of a turn-off level voltage under the control of the controller 140. The gate driving circuit 130 may sequentially supply the gate signal of the turn-on level voltage to the plurality of gate lines GL, thereby sequentially driving the plurality of gate lines GL. The gate signal may be a scan signal or a sensing signal and may not be limited to a name.

The gate driving circuit 130 may be connected to the display panel 110 by a TAB method, may be connected to the bonding pad of the display panel 110 by a COG or COP method, or may be connected to the display panel 110 by a COF method. Alternatively, the gate driving circuit 130 may be formed in the non-display area NDA of the display panel 110 as a gate in panel (GIP) type circuit. The gate driving circuit 130 may be disposed on the substrate SUB or be connected to the substrate SUB. That is, when the gate driving circuit 130 is a GIP type circuit, the gate driving circuit 130 may be disposed in the non-display area NDA of the substrate SUB. When the gate driving circuit 130 is a COG type circuit or a COF type circuit, the gate driving circuit 130 may be connected to the substrate SUB. Alternatively, the gate driving circuit 130 may be disposed on the substrate SUB and the display area DA.

Meanwhile, at least one driving circuit of the data driving circuit 120 and the gate driving circuit 130 may be disposed in the display area DA. For example, at least one driving circuit of the data driving circuit 120 and the gate driving circuit 130 may be disposed not to overlap the sub-pixels SP or may be disposed to partially or entirely overlap the sub-pixels SP.

When a specific gate line GL is enabled by the gate driving circuit 130, the data driving circuit 120 may convert the image data Data received from the controller 140 into an analog data voltage and supply the analog data voltage to the plurality of data lines DL.

The data driving circuit 120 may be connected to one side (e.g., an upper or lower side) of the display panel 110. According to a driving method and a panel design method, the data driving circuit 120 may be connected to both sides (e.g., the upper and lower sides) of the display panel 110 or may be connected to two or more sides among four sides of the display panel 110.

The gate driving circuit 130 may be connected to one side (e.g., a left or right side) of the display panel 110. According to a driving method and a panel design method, the gate driving circuit 130 may be connected to both sides (e.g., the left and right sides) of the display panel 110 or may be connected to two or more sides among the four sides of the display panel 110.

The controller 140 may be a timing controller 140 used in a typical display technology, a control device including the timing controller 140 to further perform other control functions, a control device different from the timing controller 140, or a circuit in a control device. The controller 140 may be implemented using various circuits or electronic components such as an integrated circuit (IC), a field programmable gate array (FPGA), an application specific integrated circuit (ASIC), or a processor.

The controller 140 may be mounted on a printed circuit board or a flexible printed circuit and electrically connected to the data driving circuit 120 and the gate driving circuit 130 through the printed circuit board or the flexible printed circuit.

The controller 140 may transmit and receive signals to and from the data driving circuit 120 according to one or more predetermined interfaces. Here, for example, the interfaces may include a low voltage differential signaling (LVDS) interface, an embedded clock point-to-point interface (EPI), or a serial peripheral interface (SPI).

The controller 140 may include a storage medium such as one or more registers.

The display device 100 according to the present embodiments may be a display including a back light unit, such as a liquid crystal display device, and may be a self light emission display such as an organic light-emitting diode (OLED) display, a quantum dot display, or a micro LED display.

When the display device 100 according to the present embodiments is an OLED display, each sub-pixel SP may include an OLED, which emits light by itself, as a light-emitting element. When the display device 100 according to the present embodiments is a quantum dot display, each sub-pixel SP may include a light-emitting element made of a quantum dot which is a semiconductor crystal emitting light by itself. When the display device 100 according to the present embodiments is a micro LED display, each sub-pixel SP may include a micro LED, which emits light by itself and is made based on an inorganic material, as a light-emitting element.

Figure 2:
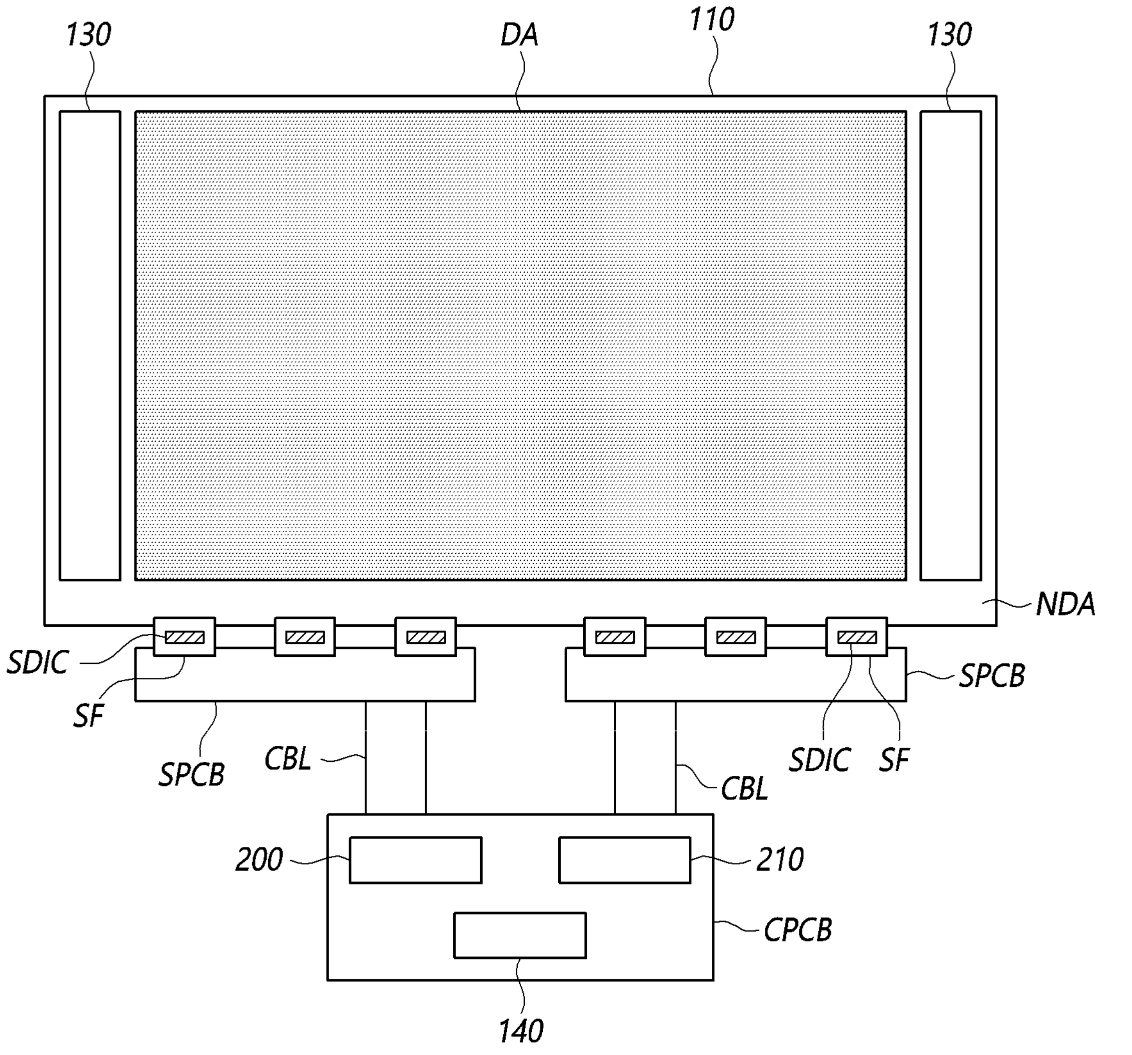
FIG. 2 is a diagram illustrating a system of the display device according to embodiments of the present disclosure.

FIG. 2 is a diagram illustrating a system of the display device 100 according to embodiments of the present disclosure.

Referring to FIG. 2, the display panel 110 may include the display area DA in which an image is displayed and the non-display area NDA in which an image is not displayed.

Referring to FIG. 2, when the data driving circuit 120 includes one or more source driver integrated circuits SDIC and is implemented in a COF method, each source driver integrated circuit SDIC may be mounted on a circuit film SF connected to the non-display area NDA of the display panel 110.

Referring to FIG. 2, the gate driving circuit 130 may be implemented as a GIP type circuit. In this case, the gate driving circuit 130 may be formed in the non-display area NDA of the display panel 110. Unlike FIG. 2, the gate driving circuit 130 may be implemented as a COF type circuit.

The display device 100 may include at least one source printed circuit board SPCB for circuitally connecting between one or more source driver integrated circuits SDIC and other device, and a control printed circuit board CPCB for mounting control components and various electrical devices.

The film SF on which the source driver integrated circuit SDIC is mounted may be connected to at least one source printed circuit board SPCB. That is, one side of the film SF on which the source driving integrated circuit SDIC is mounted may be electrically connected to the display panel 110, and the other side thereof may be electrically connected to the source printed circuit board SPCB.

The controller 140 and a power management IC (PMIC) 210 may be mounted on the control printed circuit board CPCB. The controller 140 may perform an overall control function relating to driving of the display panel 110 and control operations of the data driving circuit 120 and the gate driving circuit 130. The PMIC 210 may supply various voltages or currents to the data driving circuit 120 and the gate driving circuit 130 or control various voltages or currents which will be supplied.

At least one source printed circuit board SPCB and the control printed circuit board CPCB may be circuitically connected through at least one connection cable CBL. Here, the connection cable CBL may be, for example, a flexible printed circuit (FPC) or a flexible flat cable (FFC).

The at least one source printed circuit board SPCB and the control printed circuit board CPCB may be integrated into one printed circuit board.

The display device 100 according to embodiments of the present disclosure may further include a level shifter 200 for adjusting a voltage level. For example, the level shifter 200 may be disposed on the control printed circuit board CPCB or the source printed circuit board SPCB.

For example, in the display device 100 according to embodiments of the present disclosure, the level shifter 200 may supply signals required for gate driving to the gate driving circuit 130. For example, the level shifter 200 may supply a plurality of clock signals to the gate driving circuit 130. Thus, in response to the plurality of clock signals input from the level shifter 200, the gate driving circuit 130 may output a plurality of gate signals to the plurality of gate lines GL. Here, the plurality of gate lines GL may transmit the plurality of gate signals to the sub-pixels SP disposed in the display area DA of the substrate SUB.

The plurality of clock signals may be voltages for turning transistors on or off.

A "turn-on level voltage" may be a voltage capable of turning a transistor receiving a scan signal on, and a "turn-off level voltage" may be a voltage capable of turning a transistor receiving a scan signal off.

When a transistor is an n-type transistor, the turn-on level voltage may be a high level voltage and the turn-off level voltage may be a low level voltage. When a transistor is a p-type transistor, the turn-on level voltage may be a low level voltage and the turn-off level voltage may be a high level voltage. Hereinafter, for convenience of description, a description will be made by assuming that the turn-on level voltage is a high level voltage and the turn-off level voltage is a low level voltage.

Figure 3:
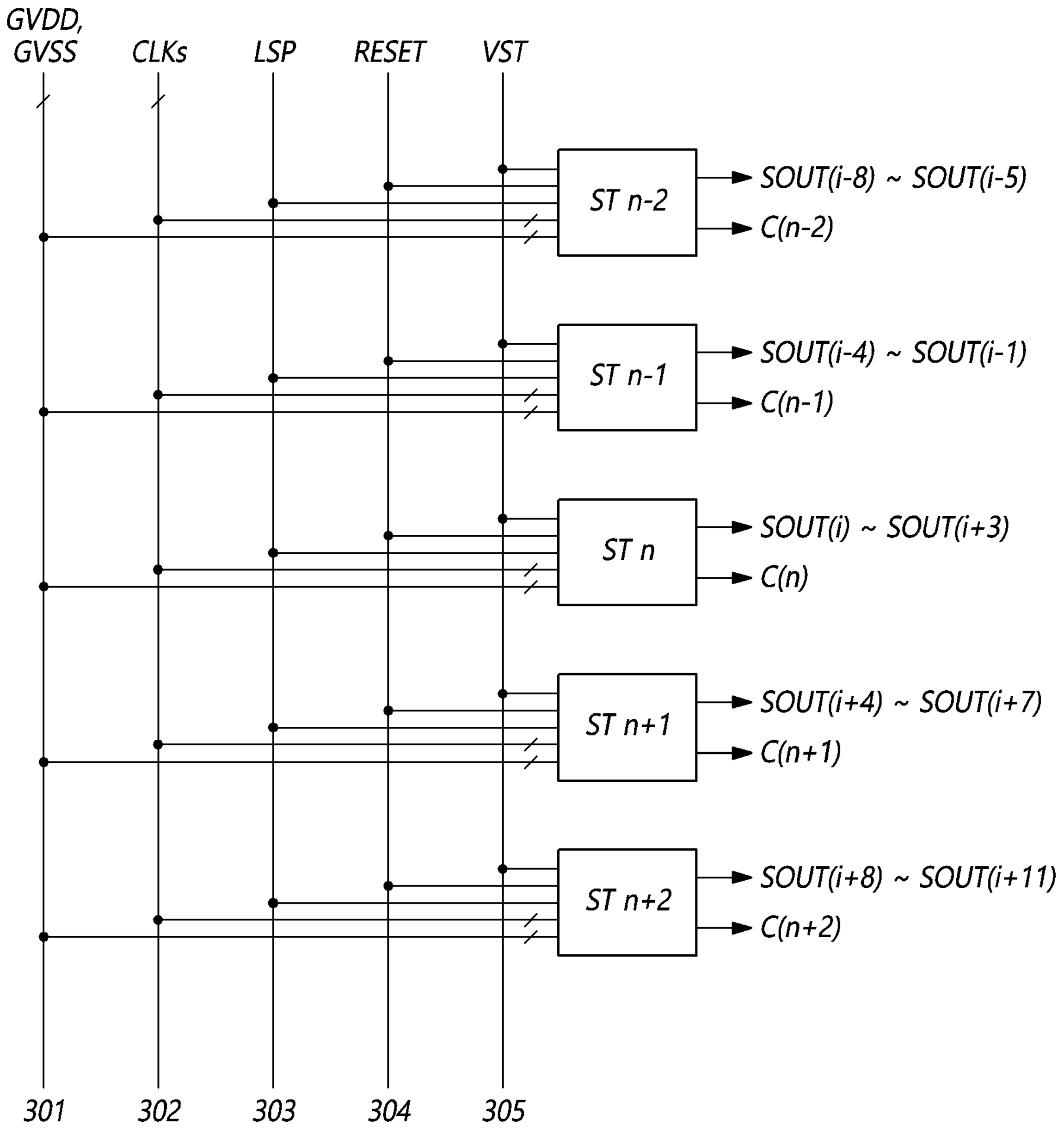
FIG. 3 is a diagram illustrating a connection relationship between signal lines and stage circuits according to embodiments of the present disclosure.

FIG. 3 is a diagram illustrating a connection relationship between signal lines and stage circuits ST according to embodiments of the present disclosure.

The gate driving circuit 130 may include a plurality of stage circuits ST.

The plurality of stage circuits ST may be electrically connected to a plurality of signal lines and may output a plurality of scan signals and a plurality of carry signals.

The plurality of signal lines may include a gate driving voltage line 301, a clock signal line 302, a line select signal line 303, a reset signal line 304, and a start signal line 305.

The gate driving voltage line 301 may supply a plurality of high voltages GVDD and a plurality of low voltages GVSS, which are supplied from a power supply circuit (not shown), to the plurality of stage circuits ST.

The plurality of high voltages GVDD may include a first high voltage GVDD1, a second high voltage GVDD2, and a third high voltage GVDD3, which have different voltage levels. The plurality of low voltages GVSS may include a first low voltage GVSS1, a second low voltage GVSS2, and a third low voltage GVSS3, which have different voltage levels.

The clock signal line 302 may supply a plurality of clock signals CLKs, which are input from the controller 140, to the plurality of stage circuits ST.

The plurality of clock signals CLKs may include a plurality of carry clock signals CRCLK or a plurality of scan clock signals SCCLK.

The line select signal line 303 may supply a line select signal LSP, which is input from the controller 140, to the plurality of stage circuits ST.

The reset signal line 304 may supply a reset signal RESET, which is input from the controller 140, to the plurality of stage circuits ST.

The start signal line 305 may supply a start signal VST, which is input from the controller 140, to the plurality of stage circuits ST.

Each of the plurality of stage circuits ST may output a plurality of scan signals SOUT and one carry signal C. The plurality of scan signals SOUT may be four scan signals SOUT.

The plurality of stage circuits ST may further include dummy stage circuits (not shown).

Figure 4:
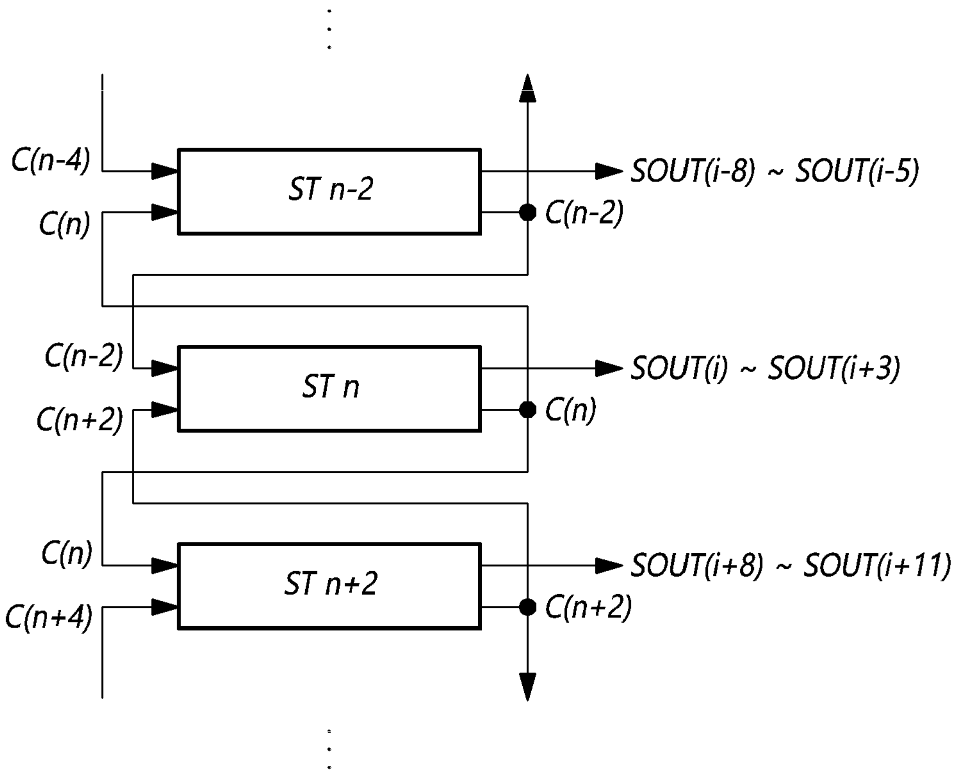
FIG. 4 is a diagram illustrating stage circuits included in a gate driving circuit according to embodiments of the present disclosure.

FIG. 4 is a diagram illustrating stage circuits ST included in the gate driving circuit 130 according to embodiments of the present disclosure.

The stage circuit ST may output four scan signals SOUT and one carry signal C.

A $(n-2)^{th}$ stage circuit ST(n−2) may receive a carry signal C(n−4) output from a $(n-4)^{th}$ stage circuit ST(n−4) as a setting signal SET. The $(n-2)^{th}$ stage circuit ST(n−2) may receive a carry signal C(n) output from a $n^{th}$ stage circuit STn as a reset signal RESET.

The $n^{th}$ stage circuit STn may receive a carry signal C(n−2) output from the $(n-2)^{th}$ stage circuit ST(n−2) as a setting signal SET. The $n^{th}$ stage circuit STn may receive the carry signal C(n+2) output from a $(n+2)^{th}$ stage circuit ST(n+2) as a reset signal RESET.

The $(n+2)^{th}$ stage circuit ST(n+2) may receive the carry signal C(n) output from a $n^{th}$ stage circuit STn as a setting signal SET. The $(n+2)^{th}$ stage circuit ST(n+2) may receive a carry signal C(n+4) output from a $(n+4)^{th}$ stage circuit ST(n+4) as a reset signal RESET.

That is, the carry signal C may be input to the next stage circuit ST(n+2) as the setting signal SET, and the carry signal C may be input to the previous stage circuit ST(n−2) as the reset signal RESET.

Figure 5:
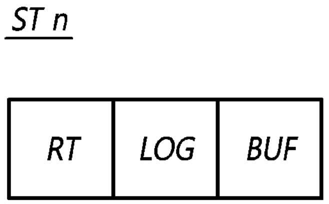
FIG. 5 is a block diagram illustrating an $n^{th}$ stage circuit according to embodiments of the present disclosure.
Figure 6:
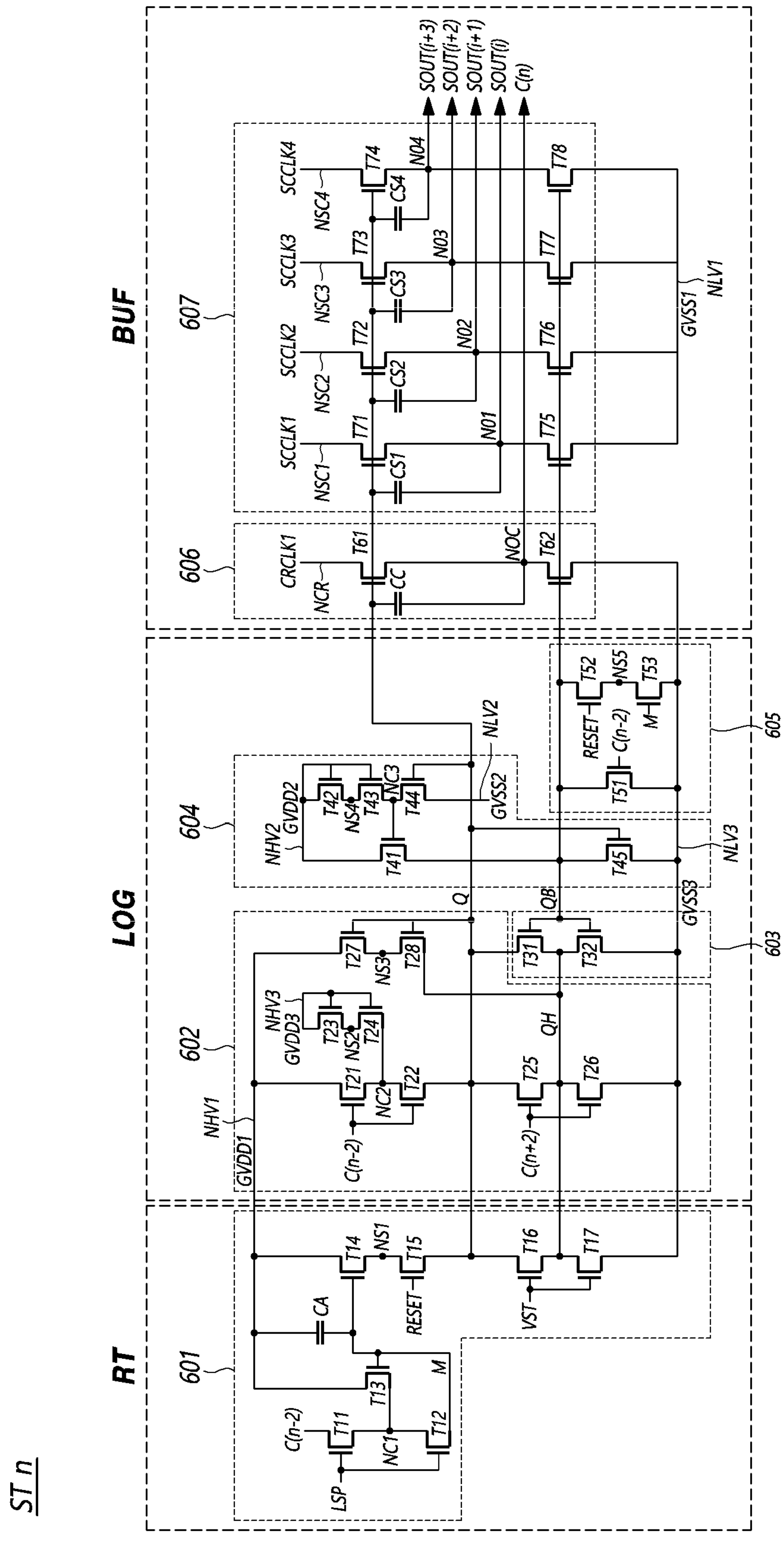
FIG. 6 is a diagram illustrating the $n^{th}$ stage circuit according to embodiments of the present disclosure.

FIG. 5 is a block diagram illustrating the $n^{th}$ stage circuit STn according to embodiments of the present disclosure. FIG. 6 shows the $n^{th}$ stage circuit STn according to embodiments of the present disclosure.

Referring to FIGS. 5 and 6 together, the $n^{th}$ stage circuit STn may include a sensing part RT, a logic part LOG, and a buffer group BUF.

Each of the plurality of stage circuits ST may include a sensing part RT, a logic part LOG, and a buffer group BUF.

The buffer group BUF may output a scan signal SOUT and a carry signal C. The buffer group BUF may include a carry signal output buffer 606 and a scan signal output buffer 607. The scan signal output buffer 607 may output a plurality of scan signals SOUT. The plurality of scan signals SOUT may be four scan signals SOUT.

The logic part LOG may control the buffer group BUF during a display drive period for driving an image. The logic part LOG may include a Q node controller 602, a first stabilizer 603, an inverter 604, and a second stabilizer 605.

The sensing part RT may control the buffer group BUF during a sensing driving period for sensing a characteristic value of a sub-pixel. The sensing part RT may include a line selector 601.

Detailed circuit structures of the sensing part RT, the logic part LOG, and the buffer group BUF will be described below.

The $n^{th}$ stage circuit STn may include the sensing part RT, the logic part LOG, and the buffer group BUF.

The $n^{th}$ stage circuit STn may include the line selector 601, the Q node controller 602, the first stabilizer 603, the inverter 604, the second stabilizer 605, the carry signal output buffer 606, and the scan signal output buffer 607.

The sensing part RT may include the line selector 601. The logic part LOG may include the Q node controller 602, the first stabilizer 603, the inverter 604, and the second stabilizer 605. The buffer group BUF may include the carry signal output buffer 606 and the scan signal output buffer 607.

The first high voltage GVDD1 may be supplied to a first high voltage node NHV1. The second high voltage GVDD2 may be supplied to a second high voltage node NHV2. The third high voltage GVDD3 may be supplied to a third high voltage node NHV3.

The first low voltage GVSS1 may be supplied to a first low voltage node NLV1. The second low voltage GVSS2 may be supplied to a second low voltage node NLV2. The third low voltage GVSS3 may be supplied to a third low voltage node NLV3.

The line selector 601 may charge an M node M with a previous stage carry signal C(n−2) and charge a Node Q at the first high voltage GVDD1.

The line selector 601 may include first, second, third, fourth, fifth, sixth and seventh transistors T11, T12, T13, T14, T15, T16 and T17 and a precharging capacitor CA.

The first transistor T11 may be electrically connected between a node to which the previous stage carry signal C(n−2) is input and a first connection node NC1.

According to the line select signal LSP input to a gate node of the first transistor T11, the first transistor T11 may be turned on, and the previous stage carry signal C(n−2) may be supplied to the first connection node NC1.

The second transistor T12 may be electrically connected between the first connection node NC1 and the M node M.

According to the line select signal LSP input to a gate node of the second transistor T12, the second transistor T12 may be turned on, and the first connection node NC1 may be electrically connected to the M node M.

When the first transistor T11 and the second transistor T12 are turned on, the previous stage carry signal C(n−2) may be supplied to charge the M node M.

The third transistor T13 may be electrically connected between the first high voltage node NHV1 and the first connection node NC1.

A gate node of the third transistor T13 may be electrically connected to the M node M. According to a voltage level of the M node M, the third transistor T13 may be turned on.

When the third transistor T13 is turned on, the first high voltage GVDD1 may be supplied to the first connection node NC1. When the line select signal LSP of a low-level is supplied to the gate node of the first transistor T11, the first transistor T11 may be maintained in a completely turned-off state due to a voltage difference between a voltage of the gate node of the first transistor T11 and the first connection node NC1. Thus, a current leakage of the first transistor T11 and a voltage drop of the M node M due to the current leakage may be prevented so that the voltage of the M node M may be stably maintained.

The precharging capacitor CA may be connected between the first high voltage node NHV1 and the M node M.

When the first transistor T11, the second transistor T12, and the third transistor T13 are turned on, the precharging capacitor CA may store a voltage difference between the first high voltage GVDD1 and the voltage of the previous stage carry signal C(n−2). When the first transistor T11, the second transistor T12, and the third transistor T13 are turned off, the voltage of the M node M may be maintained at the voltage stored in the precharging capacitor CA for a certain period of time.

The fourth transistor T14 may be electrically connected between the first high voltage node NHV1 and a first share node NS1.

A gate node of the fourth transistor T14 may be electrically connected to the M node M. According to the voltage level of the M node M, the fourth transistor T14 may be turned on, and the first high voltage GVDD1 may be transmitted to the first share node NS1.

The fifth transistor T15 may be electrically connected between the first share node NS1 and the Node Q.

The fifth transistor T15 is turned on by the reset signal RESET input to a gate node of the fifth transistor T15 so that the first share node NS1 may be electrically connected to the Node Q.

When the fourth transistor T14 and the fifth transistor T15 are turned on, the first high voltage GVDD1 may be supplied to charge the Node Q.

The sixth transistor T16 may be electrically connected between the Node Q and a QH node QH.

The sixth transistor T16 is turned on by the start signal VST supplied to a gate node of the sixth transistor T16 so that the Node Q may be electrically connected to the QH node QH.

The seventh transistor T17 may be electrically connected between the QH node QH and the third low voltage node NLV3.

The seventh transistor T17 is turned on by the start signal VST supplied to a gate node of the seventh transistor T17 so that the QH node QH may be discharged to a voltage level of the third low voltage GVSS3.

The Q node controller 602 may charge the Node Q at the first high voltage GVDD1 according to the previous stage carry signal C(n−2) and discharge the Node Q at the third low voltage GVSS3 according to the post-stage carry signal C(n+2).

The Q node controller 602 may include first to eighth transistors T21 to T28.

The first transistor T21 may be electrically connected between the first high voltage node NHV1 and a second connection node NC2.

The first transistor T21 may be turned on according to the previous stage carry signal C(n−2) input to a gate node of the first transistor T21, and the first high voltage GVDD1 may be supplied to the second connection node NC2.

The second transistor T22 may be electrically connected between the second connection node NC2 and the Node Q.

The second transistor T22 is turned on according to the previous stage carry signal C(n−2) supplied to a gate node of the second transistor T22 so that the second connection node NC2 may be electrically connected to the Node Q.

When the first transistor T21 and the second transistor T22 are turned on, the first high voltage GVDD1 may be supplied to charge the Node Q.

The third transistor T23 may be electrically connected between the third high voltage node NHV3 and a second share node NS2.

The fourth transistor T24 may be electrically connected between the second share node NS2 and the second connection node NC2.

When the third transistor T23 and the fourth transistor T24 are turned on, the third high voltage GVDD3 may be supplied to the second connection node NC2. When the previous stage carry signal C(n−2) of a low level is supplied to the gate node of the first transistor T21, the first transistor T21 may be completely maintained in a turned-off state due to a voltage difference between the gate node of the first transistor T21 and the second connection node NC2. Thus, a current leakage of the first transistor T21 and a voltage drop of the Node Q due to the current leakage may be prevented so that the voltage of the Node Q may be stably maintained.

The fifth transistor T25 may be electrically connected between the Node Q and the QH node QH.

The fifth transistor T25 is turned on according to the post-stage carry signal C(n+2) input to a gate node of the fifth transistor T25, and the Node Q may be electrically connected to the QH node QH.

The sixth transistor T26 may be connected between the QH node QH and the third low voltage node NLV3.

The sixth transistor T26 is turned on according to the post-stage carry signal C(n+2) input to a gate node of the sixth transistor T26 so that the QH node QH may be discharged at a voltage level of the third low voltage GVSS3.

When the fifth transistor T25 and the sixth transistor T26 are turned on, the Node Q and the QH node QH may be discharged at the voltage level of the third low voltage GVSS3.

The seventh transistor T27 may be electrically connected between the first high voltage node NHV1 and a third share node NS3.

A gate node of the seventh transistor T27 may be electrically connected to the Node Q. The seventh transistor T27 is turned on by the voltage of the Node Q so that the first high voltage node NHV1 may be electrically connected to the third share node NS3.

The eighth transistor T28 may be electrically connected between the third share node NS3 and the QH node QH.

A gate node of the eighth transistor T28 may be electrically connected to the Node Q. The eighth transistor T28 is turned on by the voltage of the Node Q so that the third share node NS3 may be electrically connected to the QH node QH.

When the seventh transistor T27 and the eighth transistor T28 are turned on, the first high voltage GVDD1 may be supplied to charge the QH node QH. When the post-stage carry signal C(n+2) of a low level is supplied to the gate node of the fifth transistor T25, the fifth transistor T25 may be completely maintained a turned-off state due to a voltage difference between the gate node of the fifth transistor T25 and the QH node QH. Thus, a current leakage of the fifth transistor T25 and a voltage drop of the Node Q due to the current leakage may be prevented so that the voltage of the Node Q may be stably maintained.

The first stabilizer 603 may discharge the Node Q and the QH node QH at the third low voltage GVSS3 according to a voltage level of a Node QB.

The first stabilizer 603 may include a first transistor T31 and a second transistor T32.

The first transistor T31 may be electrically connected between the Node Q and the QH node QH.

A gate node of the first transistor T31 may be electrically connected to the Node QB. The first transistor T31 is turned on by the voltage of the Node QB so that the Node Q may be electrically connected to the QH node QH.

The second transistor T32 may be electrically connected between the QH node QH and the third low voltage node NLV3.

A gate node of the second transistor T32 may be electrically connected to the Node QB. The second transistor T32 is turned on by the voltage of the Node QB so that the QH node QH may be discharged at a voltage level of the third low voltage GVSS3.

When the first transistor T31 and the second transistor T32 are turned on, the Node Q and the QH node QH may be discharged at the voltage level of the third low voltage GVSS3.

The inverter 604 may change a voltage level of the Node QB according to the voltage level of the Node Q.

The inverter 604 may include first, second, third, fourth and fifth transistors T41, T42, T43, T44, and T45.

The first transistor T41 may be electrically connected between the second high voltage node NHV2 and the Node QB.

A gate node of the first transistor T41 may be electrically connected to a third connection node NC3. The first transistor T41 is turned on by the voltage of the third connection node NC3 so that the second high voltage GVDD2 may be supplied to charge the Node QB.

The second transistor T42 may be electrically connected between the second high voltage node NHV2 and a fourth share node NS4.

The second transistor T42 is turned on by the second high voltage GVDD2 supplied to a gate node of the second transistor T42 so that the second high voltage GVDD2 may be supplied to the fourth share node NS4.

The third transistor T43 may be electrically connected between the fourth share node NS4 and the third connection node NC3.

The third transistor T43 is turned on by the second high voltage GVDD2 supplied to a gate node of the third transistor T43 so that the fourth share node NS4 may be electrically connected to the third connection node NC3.

When the second transistor T42 and the third transistor T43 are turned on, the second high voltage GVDD2 may be supplied to the third connection node NC3.

The fourth transistor T44 may be electrically connected between the third connection node NC3 and the second low voltage node NLV2.

A gate node of the fourth transistor T44 may be electrically connected to the Node Q. The fourth transistor T44 is turned on by the voltage of the Node Q so that the third connection node NC3 may be discharged at a voltage level of the second low voltage GVSS2.

The fifth transistor T45 may be electrically connected between the Node QB and the third low voltage node NLV3.

A gate node of the fifth transistor T45 may be electrically connected to the Node Q. The fifth transistor T45 is turned on by the voltage of the Node Q, and the Node QB may be discharged at a voltage level of the third low voltage GVSS3.

The second stabilizer 605 may discharge the Node QB at the voltage level of the third low voltage GVSS3 according to the input of the previous stage carry signal C(n−2), the input of the reset signal RESET, and the voltage level of the M node M.

The second stabilizer 605 may include first to third transistors T51 to T53.

The first transistor T51 may be electrically connected between the Node QB and the third low voltage node NLV3.

The first transistor T51 is turned on according to the input of the previous stage carry signal C(n−2) so that the Node QB may be discharged at the voltage level of the third low voltage GVSS3.

The second transistor T52 may be electrically connected between the Node QB and a fifth share node NS5.

The second transistor T52 is turned on by the reset signal RESET input to a gate node of the second transistor T52 so that the Node QB may be electrically connected to the fifth share node NS5.

The third transistor T53 may be electrically connected between the fifth share node NS5 and the third low voltage node NLV3.

A gate node of the third transistor T53 may be electrically connected to the M node M. The third transistor T53 is turned on by the voltage of the M node M so that the fifth share node NS5 may be electrically connected to the third low voltage node NLV3.

When the second transistor T52 and the third transistor T53 are turned on, the Node QB may be discharged at the voltage level of the third low voltage GVSS3.

The carry signal output buffer 606 may output a carry signal C(n) according to a voltage level of the Node Q or the Node QB on the basis of a carry clock signal CRCLK1 or the third low voltage GVSS3.

The carry signal output buffer 606 may include a first transistor T61, a second transistor T62, and a boosting capacitor CC.

The boosting capacitor CC may be electrically connected between a gate node of the first transistor T61 and a carry output node NOC.

The first transistor T61 may be electrically connected between a carry clock node NCR to which the carry clock signal CRCLK1 is input and the carry output node NOC.

A gate node of the first transistor T61 may be electrically connected to the Node Q. The first transistor T61 is turned on according to the voltage level of the Node Q so that the carry clock signal CRCLK1 may be output to the carry output node NOC as the carry signal C(n).

When the carry signal C(n) is output, the voltage of the carry output node NOC may rise and thus a voltage charged in the boosting capacitor CC may rise so that the voltage of the Node Q may rise to be bootstrapped. When the voltage of the Node Q is bootstrapped, the carry clock signal CRCLK may be quickly output to the carry output node NOC without voltage distortion.

The second transistor T62 may be electrically connected between the carry output node NOC and the third low voltage node NLV3.

A gate node of the second transistor T62 may be electrically connected to the Node QB. The second transistor T62 is turned on according to the voltage level of the Node QB so that the third low voltage GVSS3 is output to the carry output node NOC as the carry signal C(n) of a low level.

The scan signal output buffer 607 may output a plurality of scan signals SOUT(i), SOUT(i+1), SOUT(i+2), and SOUT(i+3) (i is a natural number) according to the voltage level of the Node Q or the Node QB on the basis of first to fourth scan clock signals SCCLK1, SCCLK2, SCCLK3, and SCCLK4 or the first low voltage GVSS1.

The scan signal output buffer 607 may include first, second, third, fourth, fifth, sixth, seventh, and eighth transistors T71, T72, T73, T74, T75, T76, T77, and T78 and first, second, third, and fourth boosting capacitors CS1, CS2, CS3, and CS4.

The first boosting capacitor CS1 may be electrically connected between a gate node of the first transistor T71 and a first output node NO1.

The first transistor T71 may be electrically connected between a first scan clock node NSC1 to which the first scan clock signal SCCLK1 is input and the first output node NO1.

The second boosting capacitor CS2 may be electrically connected between a gate node of the second transistor T72 and a second output node NO2.

The second transistor T72 may be electrically connected between a second scan clock node NSC2 to which the second scan clock signal SCCLK2 is input and the second output node NO2.

The third boosting capacitor CS3 may be electrically connected between a gate node of the third transistor T73 and a third output node NO3.

The third transistor T73 may be electrically connected between a third scan clock node NSC3 to which the third scan clock signal SCCLK3 is input and the third output node NO3.

The fourth boosting capacitor CS4 may be electrically connected between a gate node of the fourth transistor T74 and a fourth output node NO4.

The fourth transistor T74 may be electrically connected between a fourth scan clock node NSC4 to which the fourth scan clock signal SCCLK4 is input and the fourth output node NO4.

The gate node of each of the first transistor T71, the second transistor T72, the third transistor T73, and the fourth transistor T74 may be electrically connected to the Node Q. Each of the first transistor T71, the second transistor T72, the third transistor T73, and the fourth transistor T74 may be turned on according to the voltage level of the Node Q.

When the first transistor T71 is turned on, the first scan clock signal SCCLK1 may be output to the first output node NO1 as the scan signal SOUT(i).

When the second transistor T72 is turned on, the second scan clock signal SCCLK2 may be output to the second output node NO2 as the scan signal SOUT(i+1).

When the third transistor T73 is turned on, the third scan clock signal SCCLK3 may be output to the third output node NO3 as the scan signal SOUT(i+2).

When the fourth transistor T74 is turned on, the fourth scan clock signal SCCLK4 may be output to the fourth output node NO4 as the scan signal SOUT(i+3).

When the scan signals SOUT(i), SOUT(i+1), SOUT(i+2), and SOUT(i+3) are output, the voltages of the first to fourth output nodes NO1, NO2, NO3, and NO4 rise so that voltages charged in the first to fourth boosting capacitors CS1, CS2, CS3, and CS4 may rise, and thus the voltage of the Node Q may rise to be bootstrapped. When the voltage of the Node Q is bootstrapped, scan clock signals SCCLK(i), SCCLK(i+1), SCCLK(i+2), SCCLK(i+3) of high voltage levels may be quickly output to the first to fourth output nodes NO1, NO2, NO3, and NO4 without voltage distortion.

The fifth transistor T75 may be electrically connected between the first output node NO1 and the first low voltage node NLV1.

The sixth transistor T76 may be electrically connected between the second output node NO2 and the first low voltage node NLV1.

The seventh transistor T77 may be electrically connected between the third output node NO3 and the first low voltage node NLV1.

The eighth transistor T78 may be electrically connected between the fourth output node NO4 and the first low voltage node NLV1.

A gate node of each of the fifth transistor T75, the sixth transistor T76, the seventh transistor T77, and the eighth transistor T78 may be electrically connected to the Node QB. The fifth transistor T75, the sixth transistor T76, the seventh transistor T77, and the eighth transistor T78 may be turned on according to the voltage level of the Node QB.

When the fifth transistor T75 is turned on, the first low voltage GVSS1 may be output to the first output node NO1 as the scan signal SOUT(i) of a low level.

When the sixth transistor T76 is turned on, the first low voltage GVSS1 may be output to the second output node NO2 as the scan signal SOUT(i+1) of a low level.

When the seventh transistor T77 is turned on, the first low voltage GVSS1 may be output to the third output node NO3 as the scan signal SOUT(i+2) of a low level.

When the eighth transistor T78 is turned on, the first low voltage GVSS1 may be output to the fourth output node NO4 as the scan signal SOUT(i+3) of a low level.

Figure 7:
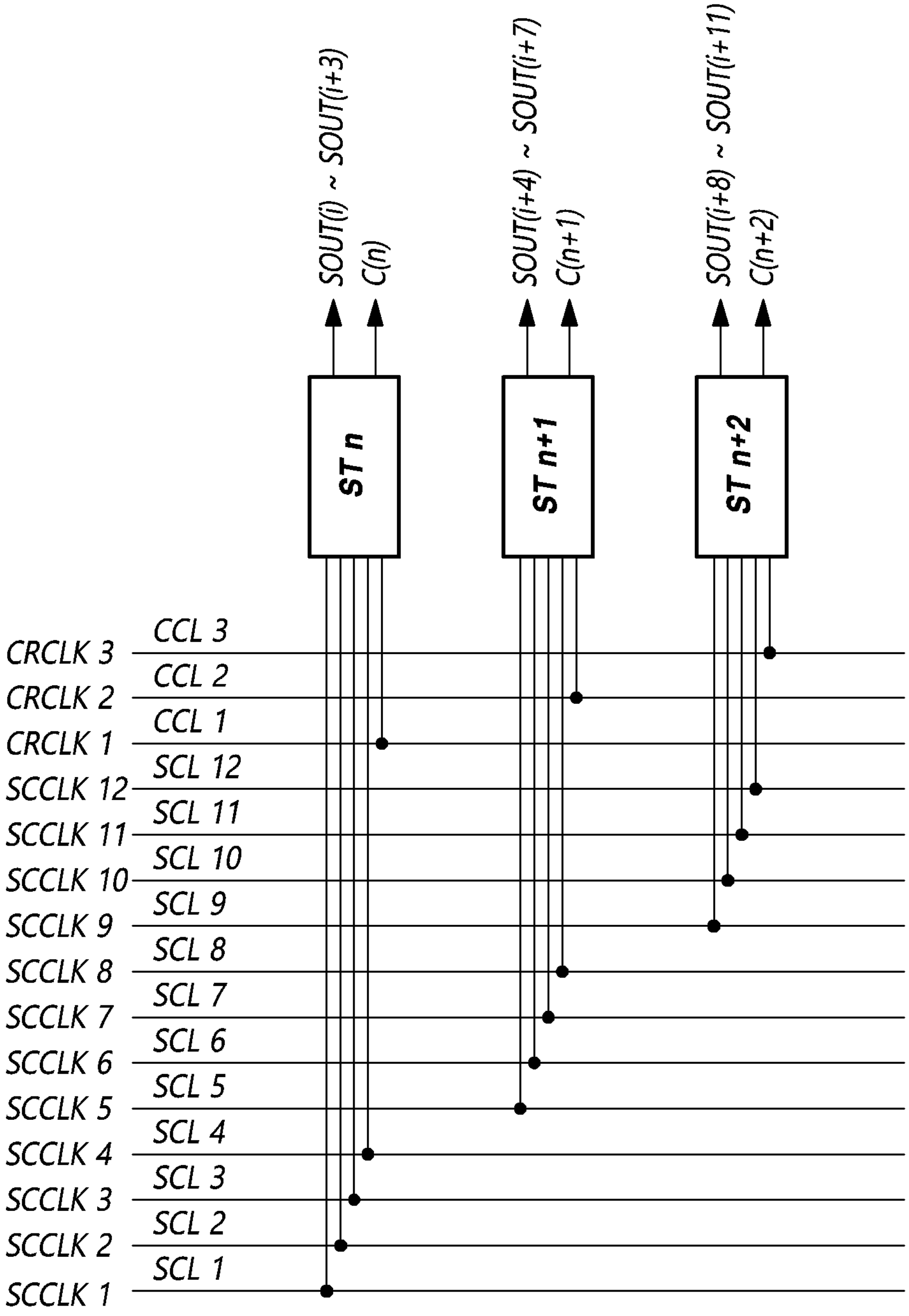
FIG. 7 is a diagram illustrating a connection relationship between clock signal lines and stage circuits according to embodiments of the present disclosure.

FIG. 7 is a diagram illustrating a connection relationship between the clock signal line 302 and the plurality of stage circuits ST according to embodiments of the present disclosure.

The plurality of stage circuits ST may include the $n^{th}$ stage circuit STn, the $(n+1)^{th}$ stage circuit ST(n+1), and the $(n+2)^{th}$ stage circuit ST(n+2) (n is a natural number greater than or equal to one).

The clock signal line 302 may include twelve (first to twelfth) scan clock signal lines SCL1 to SCL12 and three (first to third) carry clock signal lines CCL1, CCL2, and CCL3.

The $n^{th}$ stage circuit STn may be electrically connected to the first, second, third, and fourth scan clock signal lines SCL1, SCL2, SCL3, and SCL4. The $n^{th}$ stage circuit STn may be electrically connected to the first carry clock signal line CCL1.

The $(n+1)^{th}$ stage circuit ST(n+1) may be electrically connected to the fifth, sixth, seventh, and eighth scan clock signal lines SCL5, SCL6, SCL7, and SCL8. The $(n+1)^{th}$ stage circuit ST(n+1) may be electrically connected to the second carry clock signal line CCL2.

The $(n+2)^{th}$ stage circuit ST(n+2) may be electrically connected to the ninth, tenth, eleventh, and twelfth scan clock signal lines SCL9, SCL10, SCL11, and SCL12. The $(n+2)^{th}$ stage circuit ST(n+2) may be electrically connected to the third carry clock signal line CCL3.

The clock signal line 302 may be disposed in a bezel area. Since the number of clock signal lines 302 increases, the bezel area becomes larger, there is a problem in that it difficult to provide a display device with a narrow bezel width.

Thus, according to embodiments of the present disclosure, the gate driving circuit 130 and the display device 100, which are capable of reducing a bezel width, may be provided. The gate driving circuit 130 and the display device 100 of a small-area structure according to embodiments of the present disclosure will be described below.

Figure 8:
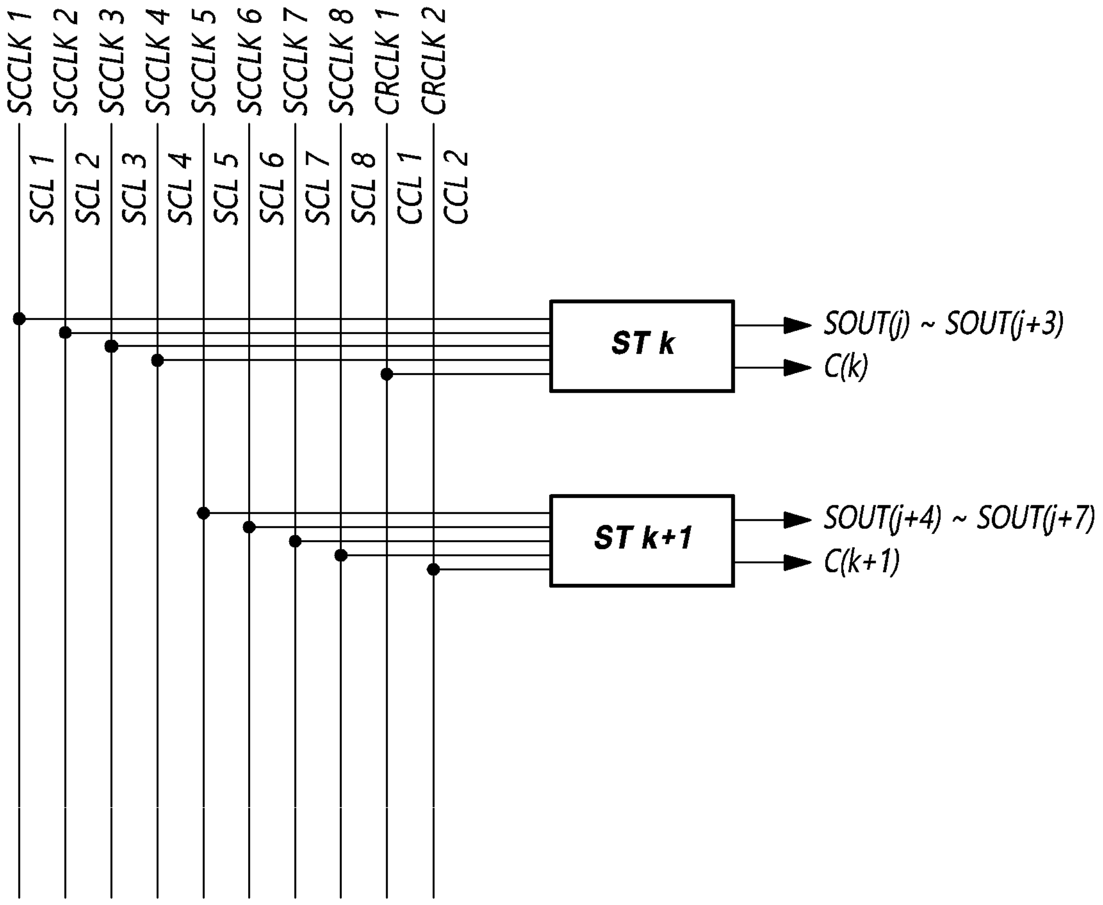
FIG. 8 is a diagram illustrating a connection relationship between clock signal lines and stage circuits according to embodiments of the present disclosure.

FIG. 8 is a diagram illustrating a connection relationship between the clock signal line 302 and a plurality of stage circuits ST according to embodiments of the present disclosure.

The plurality of stage circuits ST may be electrically connected to the plurality of clock signal lines and output a plurality of scan signals and a plurality of carry signals.

Each of the plurality of stage circuits ST may include the buffer group BUF, the logic part LOG, and the sensing part RT which are described above.

The plurality of stage circuits ST may include a $k^{th}$ stage circuit STK and a $(k+1)^{th}$ stage circuit ST(k+1) (k is a natural number greater than or equal to one).

The clock signal line 302 may include eight (first to eighth) scan clock signal lines SCL1 to SCL8 and first and two second carry clock signal lines CCL1 and CCL2.

The $k^{th}$ stage circuit STK may be electrically connected to a first subset of four clock signal lines, e.g., the first, second, third, and fourth scan clock signal lines SCL1, SCL2, SCL3, and SCLA. The $k^{th}$ stage circuit STK may be electrically connected to the first carry clock signal line CCL1. In some implementations, a $(k+2)^{th}$ stage circuit ST(k+2) is coupled to the same clock signal lines as the $k^{th}$ stage circuit STK. For an illustrative example, each of a first stage circuit ST1 (not shown in FIG. 8 for brevity) and a third stage circuit ST3 (not shown in FIG. 8 for brevity) may receive the first subset of four clock signal lies, e.g., first, second, third, and fourth scan clock signals SCL1, SCL2, SCL3, and SCL4.

The $(k+1)^{th}$ stage circuit ST(k+1) may be electrically connected to a second subset of four clock signals lines, e.g., the fifth, sixth, seventh, and eighth scan clock signal lines SCL5, SCL6, SCL7, and SCL8. The $(k+1)^{th}$ stage circuit ST(k+1) may be electrically connected to the second carry clock signal line CCL2. In some implementations, a $(k+3)^{th}$ stage circuit ST(k+3) is coupled to the same clock signal lines as the $(k+1)^{th}$ stage circuit ST(k+1). For example, each of a second stage circuit ST2 (not shown in FIG. 8 for brevity) and a fourth stage circuit ST4 (not shown in FIG. 8 for brevity) may receive the fifth, sixth, seventh and eighth scan clock signals SCL5, SCL6, SCL7, and SCL8.

When compared to the clock signal line 302 shown in FIG. 7, in FIG. 8, the ninth to twelfth scan clock signal lines SCL9 to SCL12 and the third carry clock signal line (CCL3) of FIG. 7 are not disposed. Therefore, since the number of clock signal lines is reduced, the bezel width can be reduced.

Figure 9:
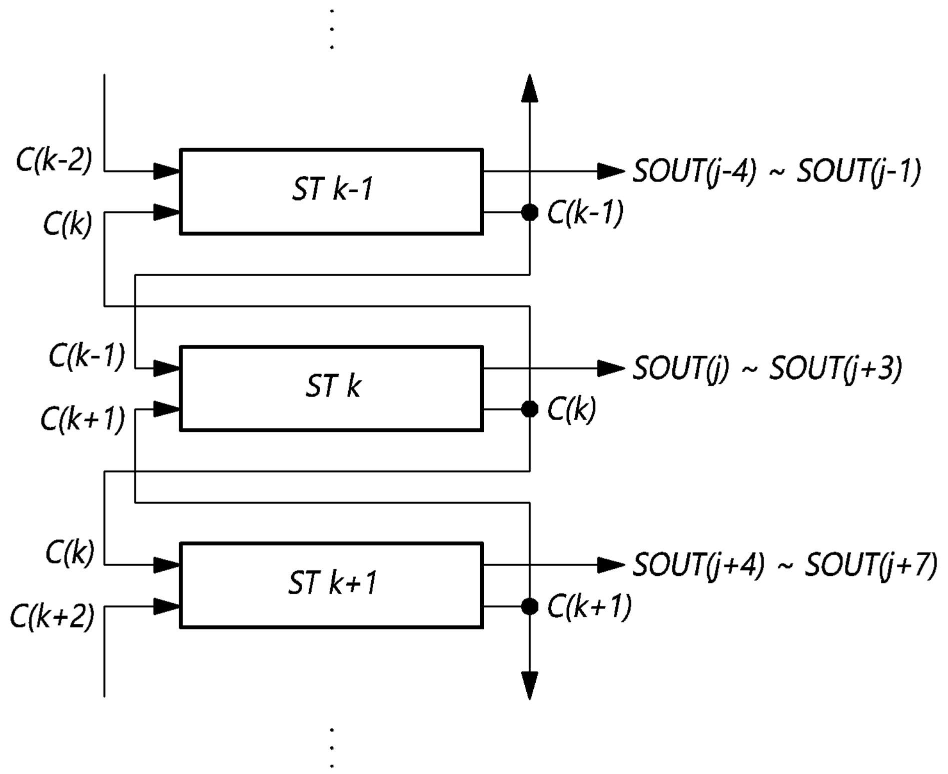
FIG. 9 is a diagram illustrating stage circuits included in the gate driving circuit according to embodiments of the present disclosure.

FIG. 9 is a diagram illustrating a plurality of stage circuits ST included in the gate driving circuit 130 according to embodiments of the present disclosure.

Each of the plurality of stage circuits ST may output a plurality of scan signals SOUT and a carry signal C. The plurality of scan signals SOUT may be four scan signals SOUT.

The plurality of stage circuits ST may include a $(k-1)^{th}$ stage circuit ST(k−1), a $k^{th}$ stage circuit STK, and a $(k+1)^{th}$ stage circuit ST(k+1). That is, the plurality of stage circuits ST may include a first stage circuit, a second stage circuit, a third stage circuit, a fourth stage circuit, etc.

The carry signal C of a previous stage may be input to the stage circuit ST as a setting signal SET. The carry signal C of a subsequent stage may be input to the stage circuit ST as a reset signal RESET.

The $(k-1)^{th}$ stage circuit ST(k−1) may be electrically connected to a line to which a carry signal output from a $(k-2)^{th}$ stage circuit ST(k−2) is input and a line to which a carry signal output from the $k^{th}$ stage circuit STk is input.

The $(k-1)^{th}$ stage circuit ST(k−1) may receive a carry signal C(k−2) output from the $(k-2)^{th}$ stage circuit ST(k−2) as the setting signal SET. The $(k-1)^{th}$ stage circuit ST(k−1) may receive a carry signal C(k) output from the $k^{th}$ stage circuit STK as the reset signal RESET.

The $k^{th}$ stage circuit STk may be electrically connected to a line to which a carry signal output from the $(k-1)^{th}$ stage circuit ST(k−1) is input and a line to which a carry signal output from the $(k+1)^{th}$ stage circuit ST(k+1) is input.

The $k^{th}$ stage circuit STk may receive a carry signal C(k−1) output from the $(k-1)^{th}$ stage circuit ST(k−1) as the setting signal SET. The $k^{th}$ stage circuit STK may receive a carry signal C(k+1) output from the $(k+1)^{th}$ stage circuit ST(k+1) as the reset signal RESET.

The $(k+1)^{th}$ stage circuit ST(k+1) may be electrically connected to a line to which a carry signal output from the $k^{th}$ stage circuit STk is input and line to which a carry signal output from a $(k+2)^{th}$ stage circuit ST(k+2) is input.

The $(k+1)^{th}$ stage circuit ST(k+1) may receive a carry signal C(k) output from the $k^{th}$ stage circuit STk as the setting signal SET. The $(k+1)^{th}$ stage circuit ST(k+1) may receive a carry signal C(k+2) output from the $(k+2)^{th}$ stage circuit ST(k+2) as the reset signal RESET.

That is, the first stage circuit may output a first setting signal SET to the second stage circuit and receive a first reset signal RESET from the second stage circuit. The second stage circuit may output a second setting signal SET to the third stage circuit and receive a second reset signal RESET from the third stage circuit. The third stage circuit may output a third setting signal SET to the fourth stage circuit and receive a third reset signal RESET from the fourth stage circuit.

In the above description, the first setting signal SET may be a first carry signal output from the first stage circuit, the first reset signal RESET may be a second carry signal output from the second stage circuit, the second setting signal SET may be a second carry signal output from the second stage circuit, the second reset signal RESET may be a third carry signal output from the third stage circuit, the third setting signal SET may be a third carry signal output from the third stage circuit, and the third reset signal RESET may be a fourth carry signal output from the fourth stage circuit.

Figure 10:
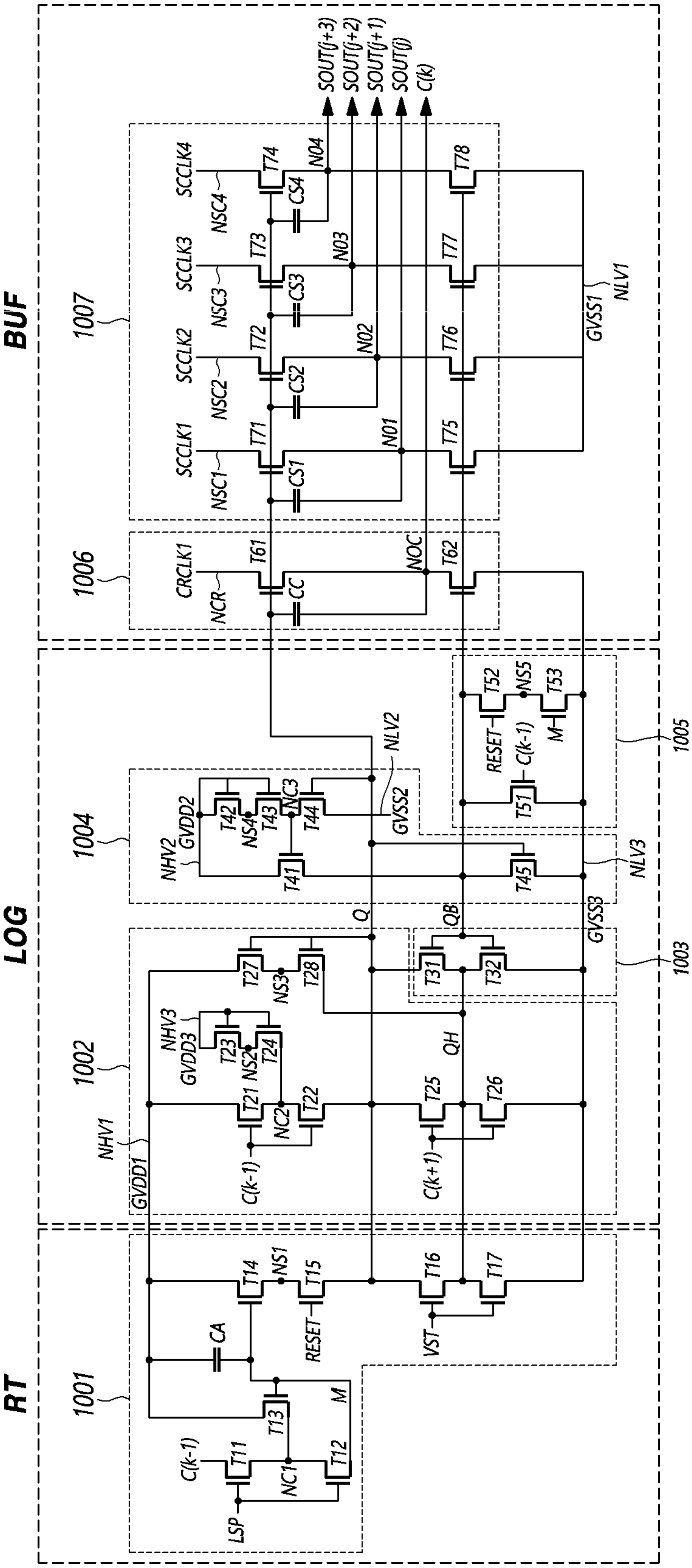
FIG. 10 is a diagram illustrating a $k^{th}$ stage circuit according to embodiments of the present disclosure.

FIG. 10 is a diagram illustrating the $k^{th}$ stage circuit STk according to embodiments of the present disclosure.

The $k^{th}$ stage circuit STk may include a sensing part RT, a logic part LOG, and a buffer group BUF.

The $k^{th}$ stage circuit STk may include a line selector 1001, a Q node controller 1002, a first stabilizer 1003, an inverter 1004, a second stabilizer 1005, a carry signal output buffer 1006, and a scan signal output buffer 1007.

The sensing part RT may include the line selector 1001. The logic part LOG may include the Q node controller 1002, the first stabilizer 1003, the inverter 1004, and the second stabilizer 1005. The buffer group BUF may include the carry signal output buffer 1006 and the scan signal output buffer 1007.

Among the features of the $k^{th}$ stage circuit STK shown in FIG. 10, descriptions of the same features as those of the $n^{th}$ stage circuit STn described in FIG. 6 may be omitted.

A previous stage carry signal C(k−1) may be supplied to a first transistor T11 included in the line selector 1001. That is, the sensing part RT may receive the previous stage carry signal C(k−1).

The previous stage carry signal C(k−1) may be supplied to a gate node of a first transistor T21 included in the Q node controller 1002. The previous stage carry signal C(k−1) may be supplied to a gate node of a second transistor T22 included in the Q node controller 1002.

A post-stage carry signal C(k+1) may be supplied to a gate node of a third transistor T23 included in the Q node controller 1002. The post-stage carry signal C(k+1) may be supplied to a gate node of a fourth transistor T24 included in the Q node controller 1002.

The previous stage carry signal C(k−1) may be supplied to a gate node of a first transistor T51 included in the second stabilizer 1005.

That is, the logic part LOG may receive the previous stage carry signal C(k−1) and the post-stage carry signal C(k+1).

A first carry clock signal CRCLK1 may be supplied to a first transistor T61 included in the carry signal output buffer 1006.

A carry signal C(k) may be output to a carry output node NOC included in the carry signal output buffer 1006.

The first scan clock signal SCCLK1 may be supplied to a first transistor T71 included in the scan signal output buffer 1007.

A second scan clock signal SCCLK2 may be supplied to a second transistor T72 included in the scan signal output buffer 1007.

A third scan clock signal SCCLK3 may be supplied to a third transistor T73 included in the scan signal output buffer 1007.

A fourth scan clock signal SCCLK4 may be supplied to a fourth transistor T74 included in the scan signal output buffer 1007.

A $j^{th}$ scan signal SOUT(j) may be output to a first output node NO1 included in the scan signal output buffer 1007.

A $(j+1)^{th}$ scan signal SOUT(j+1) may be output to a second output node NO2 included in the scan signal output buffer 1007.

A (j+2)$^{th}$ scan signal SOUT(j+2) may be output to a third output node NO3 included in the scan signal output buffer 1007.

A (j+3)$^{th}$ scan signal SOUT(j+3) may be output to a fourth output node NO4 included in the scan signal output buffer 1007.

Figure 11:
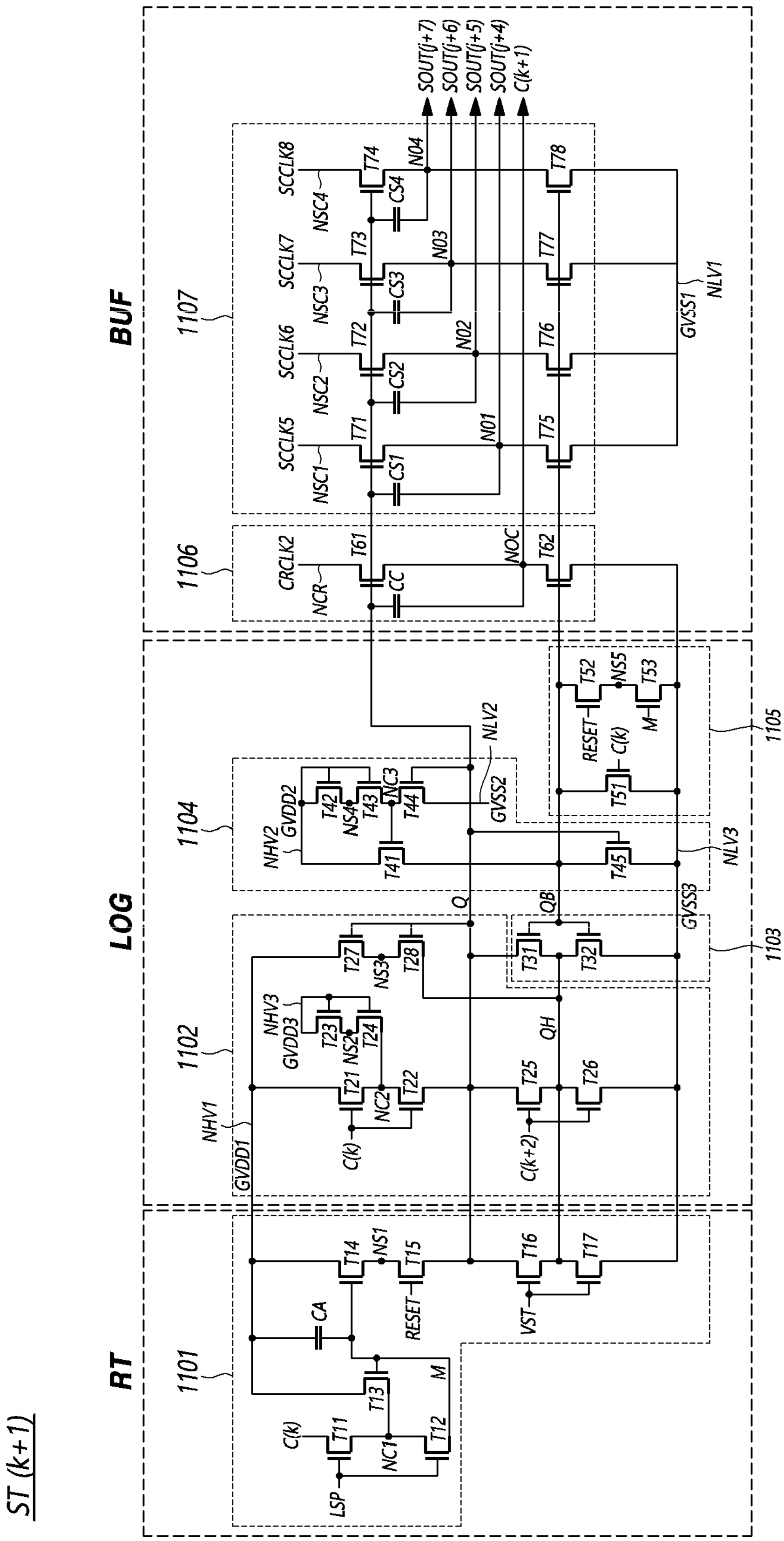
FIG. 11 is a diagram illustrating a $(k+1)^{th}$ stage circuit according to embodiments of the present disclosure.

FIG. 11 is a diagram illustrating a (k+1)$^{th}$ stage circuit ST(k+1) according to embodiments of the present disclosure.

The (k+1)$^{th}$ stage circuit ST(k+1) may include a sensing part RT, a logic part LOG, and a buffer group BUF.

The (k+1)$^{th}$ stage circuit ST(k+1) may include a line selector 1101, a Q node controller 1102, a first stabilizer 1103, an inverter 1104, a second stabilizer 1105, a carry signal output buffer 1106, and a scan signal output buffer 1107.

The sensing part RT may include the line selector 1101. The logic part LOG may include the Q node controller 1102, the first stabilizer 1103, the inverter 1104, and the second stabilizer 1105. The buffer group BUF may include the carry signal output buffer 1106 and the scan signal output buffer 1107.

Among the features of the (k+1)$^{th}$ stage circuit ST(k+1) shown in FIG. 11, descriptions of the same features as those of the n$^{th}$ stage circuit STn described in FIG. 6 may be omitted.

A previous stage carry signal C(k) may be supplied to a first transistor T11 included in the line selector 1101. That is, the sensing part RT may receive the previous stage carry signal C(k).

The previous stage carry signal C(k) may be supplied to a gate node of a first transistor T21 included in the Q node controller 1102. The previous stage carry signal C(k) may be supplied to a gate node of a second transistor T22 included in the Q node controller 1102.

A post-stage carry signal C(k+2) may be supplied to a gate node of a third transistor T23 included in the Q node controller 1102. The post-stage carry signal C(k+2) may be supplied to a gate node of a fourth transistor T24 included in the Q node controller 1102.

The previous stage carry signal C(k) may be supplied to a gate node of a first transistor T51 included in the second stabilizer 1105.

That is, the logic part LOG may receive the previous stage carry signal C(k) and the post-stage carry signal C(k+2).

A second carry clock signal CRCLK2 may be supplied to a first transistor T61 included in the carry signal output buffer 1106.

The post-stage carry signal C(k+2) may be output to a carry output node NOC included in the carry signal output buffer 1106.

A fifth scan clock signal SCCLK5 may be supplied to a first transistor T71 included in the scan signal output buffer 1107.

A sixth scan clock signal SCCLK6 may be supplied to a second transistor T72 included in the scan signal output buffer 1107.

A seventh scan clock signal SCCLK7 may be supplied to a third transistor T73 included in the scan signal output buffer 1107.

An eighth scan clock signal SCCLK8 may be supplied to a fourth transistor T74 included in the scan signal output buffer 1107.

A (j+4)$^{th}$ scan signal SOUT(j+4) may be output to a first output node NO1 included in the scan signal output buffer 1107.

A (j+5)$^{th}$ scan signal SOUT(j+5) may be output to a second output node NO2 included in the scan signal output buffer 1107.

A (j+6)$^{th}$ scan signal SOUT(j+6) may be output to a third output node NO3 included in the scan signal output buffer 1107.

A (j+7)$^{th}$ scan signal SOUT(j+7) may be output to a fourth output node NO4 included in the scan signal output buffer 1107.

Figure 12:
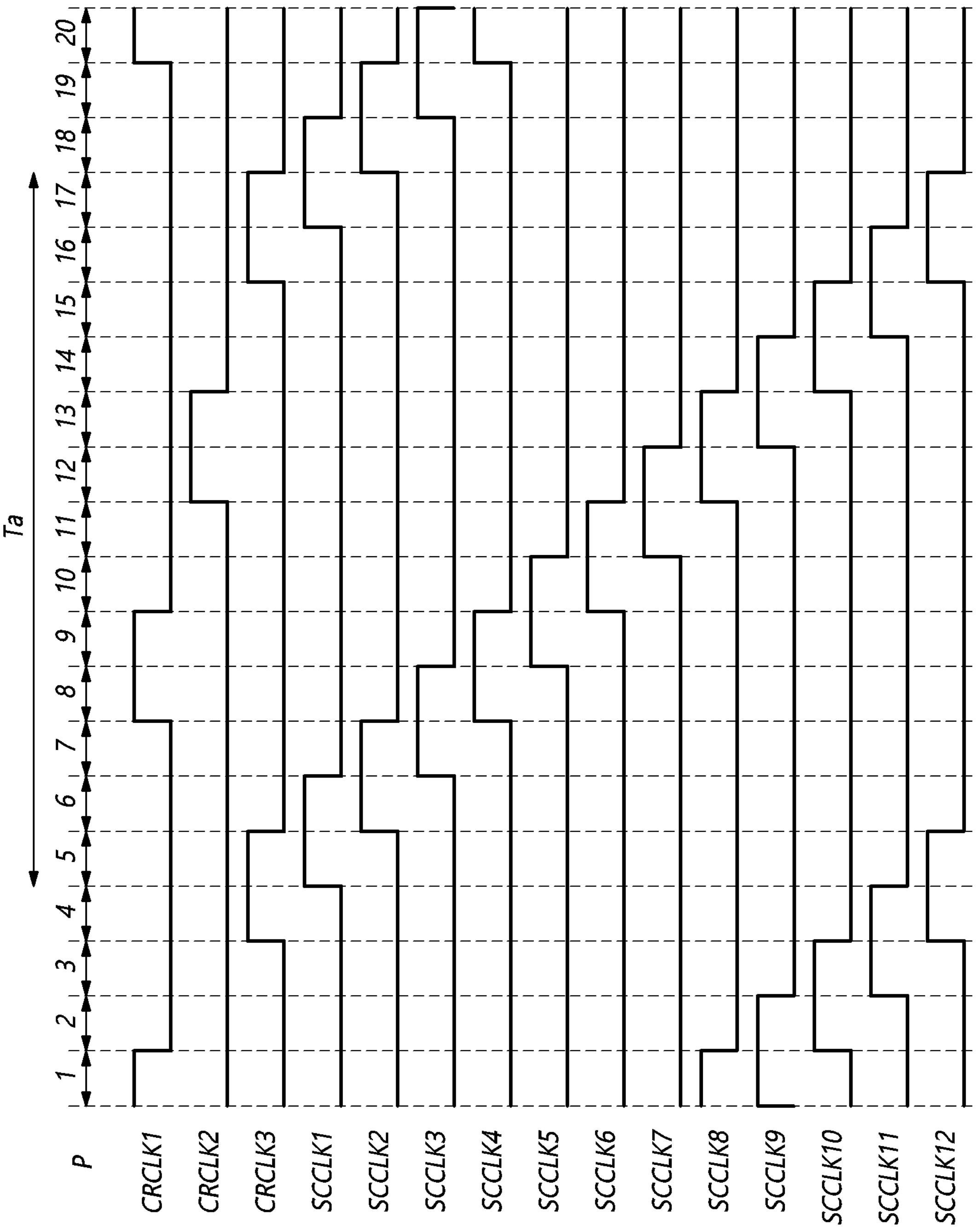
FIG. 12 is a diagram illustrating twelve scan clock signals and three carry clock signals according to embodiments of the present disclosure.

FIG. 12 is a diagram illustrating twelve scan clock signals SCCLK and three carry clock signals CRCLK according to embodiments of the present disclosure.

The twelve scan clock signals SCCLK and the three carry clock signals CRCLK shown in FIG. 12 are signals input to the clock signal line 302 shown in FIG. 7.

A period P during which signals are applied may be divided into 20 periods. The 20 periods may be a first period to a 20$^{th}$ period.

The first to twelfth scan clock signals SCCLK and the first to third carry clock signals CRCLK may each be a high level or a low level during the 20 periods.

For the 20 periods, the first to twelfth scan clock signals SCCLK and the first to third carry clock signals CRCLK may each continuously maintain a high level during two periods and a low level during the remaining periods.

The high level continuously maintained during the two periods may be divided into a front-end high level period and a rear-end high level period.

A rear-end high level of a first scan clock signal SCCLK1 and a front-end high level of a second scan clock signal SCCLK2 may overlap to maintain a high level. A rear-end high level of an eleventh scan clock signal SCCLK11 and a front-end high level of a twelfth scan clock signal SCCLK12 may overlap to maintain a high level. A rear-end high level of the twelfth scan clock signal SCCLK12 and a front-end high level of the first scan clock signal SCCLK1 may overlap to maintain a high level. That is, the first to twelfth scan clock signals SCCLK may overlap for one period and maintain a high level.

The first carry clock signal CRCLK1 may maintain a high level for the same period as the fourth scan clock signal SCCLK4.

The second carry clock signal CRCLK2 may maintain a high level for the same period as the eighth scan clock signal SCCLK8.

The third carry clock signal CRCLK3 may maintain a high level for the same period as the twelfth scan clock signal SCCLK12.

The first to twelfth scan clock signals SCCLK and the first to third carry clock signals CRCLK may be cyclically supplied to the clock signal line 320 with the fifth to seventh periods as one cycle Ta. A start period of the one cycle Ta is not limited to the fifth period.

Figure 13:
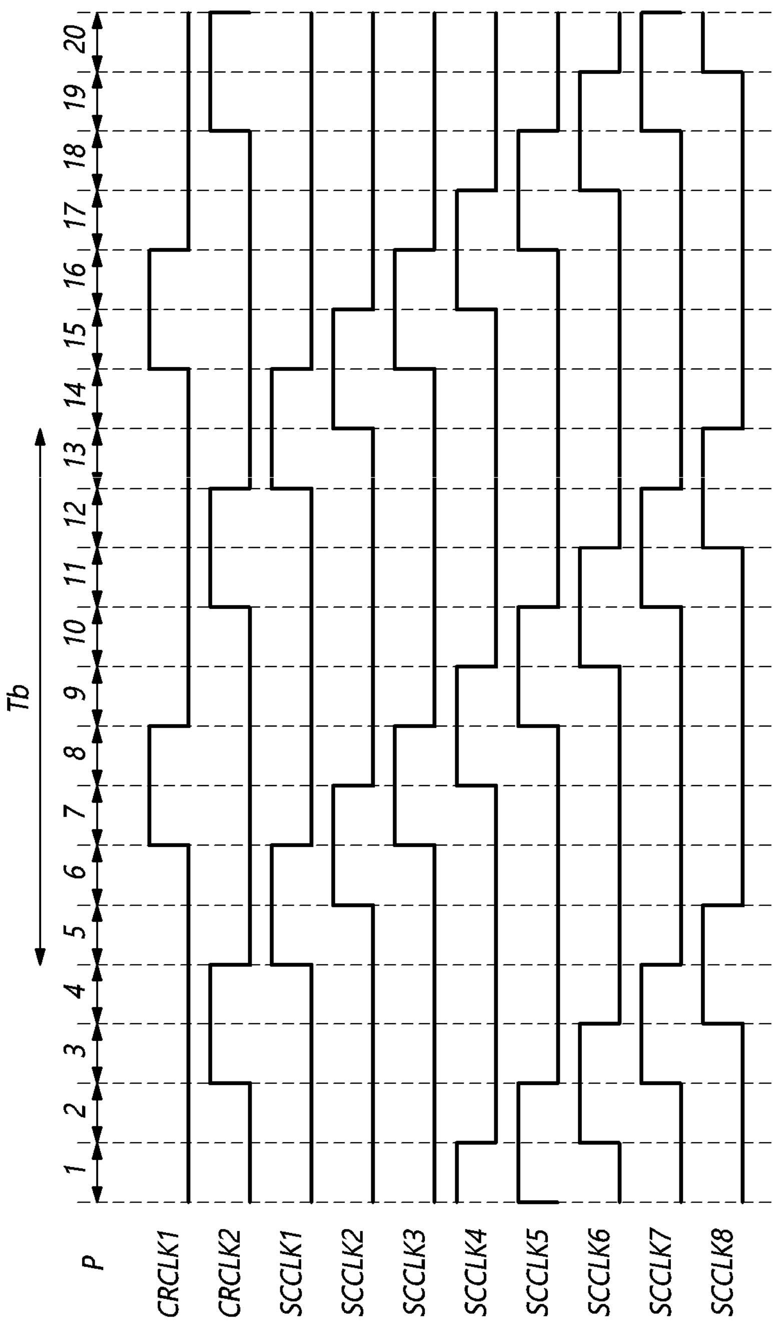
FIG. 13 is a diagram illustrating eight scan clock signals and two carry clock signals according to embodiments of the present disclosure.

FIG. 13 is a diagram illustrating eighth scan clock signals SCCLK and two carry clock signals CRCLK according to embodiments of the present disclosure.

The eighth scan clock signals SCCLK and the two carry clock signals CRCLK shown in FIG. 13 are signals input to the clock signal line 302 shown in FIG. 8.

A period P during which signals are applied may be divided into 20 periods. The 20 periods may be a first period to a 20th period.

First to eighth scan clock signals SCCLK and first and second carry clock signals CRCLK may each be a high level or a low level during the 20 periods.

For the 20 periods, the first to eighth scan clock signals SCCLK and the first and second carry clock signals CRCLK may each continuously maintain a high level during two periods and a low level during the remaining periods.

The high level continuously maintained during the two periods may be divided into a front-end high level period and a rear-end high level period.

A rear-end high level of a first scan clock signal SCCLK1 and a front-end high level of a second scan clock signal SCCLK2 may overlap to maintain a high level. A rear-end high level of a seventh scan clock signal SCCLK7 and a front-end high level of an eighth scan clock signal SCCLK8 may overlap to maintain a high level. A rear-end high level of the eighth scan clock signal SCCLK8 and a front-end high level of the first scan clock signal SCCLK1 may overlap to maintain a high level. That is, the first to eighth scan clock signals SCCLK may overlap for one period and maintain a high level.

Although not shown in FIG. 13, due to the overlap of the above-described signals, the plurality of scan signals may also overlap to be output. For example, the high level period (turn-on level voltage period) of the first scan signal and the high level period (turn-on level voltage period) of the second scan signal may overlap.

The first carry clock signal CRCLK1 may maintain a high level for the same period as the third scan clock signal SCCLK3.

The second carry clock signal CRCLK2 may maintain a high level for the same period as the seventh scan clock signal SCCLK7.

The first to eighth scan clock signals SCCLK and the first and second carry clock signals CRCLK may be cyclically supplied to the clock signal line 320 with the fifth to thirteenth periods as one cycle Tb. A start period of the one cycle Tb is not limited to the fifth period.

A brief description of the above-described embodiments of the present disclosure will be made as follows.

According to the embodiments of the present disclosure, there may be provided a gate driving circuit including a plurality of stage circuits electrically connected to a plurality of clock signal lines and configured to output a plurality of scan signals and a plurality of carry signals, wherein the plurality of clock signal lines include first to eighth scan clock signal lines and first and second carry clock signal lines, each of the plurality of stage circuits includes a buffer group configured to output the plurality of scan signals and the carry signal, a logic part configured to control the buffer group during a display driving period for driving an image, and a sensing part configured to control the buffer group during a sensing driving period for sensing a characteristic value of a sub-pixel, and the plurality of stage circuits include a first stage circuit electrically connected to the first to fourth scan clock signal lines and the first carry clock signal line, a second stage circuit electrically connected to the fifth to eighth scan clock signal lines and the second carry clock signal line, and a third stage circuit electrically connected to the first to fourth scan clock signal lines and the first carry clock signal line.

The second stage circuit may be electrically connected to a line to which the first carry signal output from the first stage circuit is input and a line to which a third carry signal output from the third stage circuit is input.

The sensing part included in the second stage circuit may receive the first carry signal output from the first stage circuit, and the logic part included in the second stage circuit may receive the third carry signal output from the third stage circuit.

The buffer group included in the second stage circuit may include the carry signal output buffer electrically connected to the second carry clock signal line, and a scan signal output buffer electrically connected to the fifth to eighth scan clock signal lines.

The first to eighth scan clock signal lines and the first to second carry clock signal lines may be disposed in a non-display area of a display panel.

The gate driving circuit may be a circuit embedded in a panel, which is disposed in the non-display area of the display panel.

According to the embodiments of the present disclosure, there may be provided a display device including a plurality of scan lines, a plurality of clock signal lines including first to eighth scan clock signal lines and first and second carry clock signal lines, a gate driving circuit electrically connected to the plurality of clock signal lines and configured to drive the plurality of scan lines, wherein the gate driving circuit includes a plurality of stage circuits that are electrically connected to the plurality of clock signal lines and output a plurality of scan signals and a plurality of carry signals, each of the plurality of stage circuits includes a buffer group configured to output the plurality of scan signals and the carry signal, a logic part configured to control the buffer group during a display driving period for driving an image, and a sensing part configured to control the buffer group during a sensing driving period for sensing a characteristic value of a sub-pixel, the plurality of stage circuits include a first stage circuit, a second stage circuit, and a third stage circuit, the first to fourth scan clock signal lines and the first carry clock signal line are electrically connected to the first stage circuit and the third stage circuit, and the fifth to eighth scan clock signal lines and the second carry clock signal line are electrically connected to the second stage circuit.

The second stage circuit may be electrically connected to a line to which the first carry signal output from the first stage circuit is input and a line to which a third carry signal output from the third stage circuit is input.

The gate driving circuit may be disposed in a display panel on which the plurality of scan lines and the plurality of clock signal lines are disposed.

According to the embodiments of the present disclosure, there may be provided a gate driving circuit including a plurality of stage circuits electrically connected to a plurality of clock signal lines and configured to output a plurality of scan signals and a plurality of carry signals, wherein the plurality of clock signal lines include first to eighth scan clock signal lines and first and second carry clock signal lines, each of the plurality of stage circuits includes a buffer group configured to output the plurality of scan signals and the plurality of carry signals, a logic part configured to control the buffer group during a display driving period for driving an image, and a sensing part configured to control the buffer group during a sensing driving period for sensing a characteristic value of a sub-pixel, the plurality of stage circuits include a $(2n-1)^{th}$ stage circuit electrically connected to the first to fourth scan clock signal lines and the first carry clock signal line, a $2n^{th}$ stage circuit electrically connected to the fifth to eighth scan clock signal lines and the second carry clock signal line, and n is a natural number that is one or more.

The $2n^{th}$ stage circuit may be electrically connected to a line to which a $(2n-1)^{th}$ carry signal output from the $(2n-1)^{th}$ stage circuit is input and a line to which a $(2n+1)^{th}$ carry signal output from a $(2n+1)^{th}$ stage circuit is input.

According to the embodiments of the present disclosure, there may be provided a gate driving circuit including a first stage circuit configured to output first to fourth scan signals, a second stage circuit configured to output fifth to eighth scan signals, a third stage circuit configured to output ninth to twelfth scan signals, and a fourth stage circuit configured to output thirteenth to sixteenth scan signals, wherein the first stage circuit outputs a first setting signal to the second stage circuit and receives a first reset signal from the second stage circuit, the second stage circuit outputs a second setting signal to the third stage circuit and receives a second reset signal from the third stage circuit, and the third stage circuit outputs a third setting signal to the fourth stage circuit and receives a third reset signal from the fourth stage circuit.

The first setting signal may be a first carry signal output from the first stage circuit, the first reset signal may be a second carry signal output from the second stage circuit, the second setting signal may be the second carry signal output from the second stage circuit, the second reset signal may be a third carry signal output from the third stage circuit, the third setting signal is the third carry signal output from the third stage circuit, and the third reset signal may be a fourth carry signal output from the fourth stage circuit.

The first stage circuit may receive first to fourth scan clock signals, the second stage circuit may receive fifth to eighth scan clock signals having phases different from those of the first to fourth scan clock signals, the third stage circuit may receive the first to fourth scan clock signals, and the fourth stage circuit may receive the fifth to eighth scan clock signals.

A turn-on level voltage period of the first scan signal may overlap a turn-on level voltage period of the second scan signal.

In accordance with the above-described embodiments of the present disclosure, a gate driving circuit having a small-area structure, a display panel, and a display device can be provided.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A gate driving circuit comprising a plurality of stage circuits electrically connected to a plurality of clock signal lines and configured to output a plurality of scan signals and a plurality of carry signals, wherein the plurality of clock signal lines include first, second, third, fourth, fifth, sixth, seventh, and eighth scan clock signal lines and first and second carry clock signal lines, each of the plurality of stage circuits includes:

a buffer group configured to output one or more scan signals of the plurality of scan signals and one or more carry signals of the plurality of carry signals;

a logic part configured to control the buffer group during a display driving period for driving an image; and a sensing part configured to control the buffer group during a sensing driving period for sensing a characteristic value of a sub-pixel, and the plurality of stage circuits include:

a first stage circuit electrically connected to the first, second, third and fourth scan clock signal lines and the first carry clock signal line;

a second stage circuit electrically connected to the fifth, sixth, seventh, and eighth scan clock signal lines and the second carry clock signal line; and a third stage circuit electrically connected to the first, second, third, and fourth scan clock signal lines and the first carry clock signal line.

2. The gate driving circuit of claim 1, wherein:

the second stage circuit is electrically connected to receive as an input a first carry signal output from the first stage circuit; and the second stage circuit is electrically connected to receive as an input a third carry signal output from the third stage circuit.

3. The gate driving circuit of claim 2, wherein:

the sensing part included in the second stage circuit is connected to receive the first carry signal output from the first stage circuit; and the logic part included in the second stage circuit is connected to receive the third carry signal output from the third stage circuit.

4. The gate driving circuit of claim 2, wherein the buffer group included in the second stage circuit includes:

a carry signal output buffer electrically connected to the second carry clock signal line; and a scan signal output buffer electrically connected to the fifth, sixth, seventh, and eighth scan clock signal lines.

5. The gate driving circuit of claim 1, wherein the scan clock signal lines and the carry clock signal lines are disposed in a non-display area of a display panel.

6. The gate driving circuit of claim 1, wherein the gate driving circuit is embedded in a panel disposed in a non-display area of a display panel.

7. The gate driving circuit of claim 1, wherein the second stage circuit is immediately subsequent to the first stage circuit, and the third stage circuit is immediately subsequent to the second stage circuit.

8. The gate driving circuit of claim 7, wherein the plurality of stage circuits include:

a fourth stage circuit electrically connected to the fifth, sixth, seventh, and eighth scan clock signal lines and the second carry clock signal line.

9. The gate driving circuit of claim 8, wherein the fourth stage circuit is immediately subsequent to the second stage circuit.

10. A display device comprising:

a plurality of scan lines;

a plurality of clock signal lines including a set of scan clock signal lines and a first carry clock signal and a second carry clock signal; and a gate driving circuit electrically connected to the plurality of clock signal lines and configured to drive the plurality of scan lines, wherein the gate driving circuit includes a plurality of stage circuits electrically that are connected to the plurality of clock signal lines and are configured to output a plurality of scan signals and a plurality of carry signals, each of the plurality of stage circuits includes:

a buffer group configured to output one or more scan signals of the plurality of scan signals and one or more carry signals of the plurality of carry signals;

a logic part configured to control the buffer group during a display driving period for driving an image; and a sensing part configured to control the buffer group during a sensing driving period for sensing a characteristic value of a sub-pixel, the plurality of stage circuits include a first stage circuit, a second stage circuit, and a third stage circuit, a first subset of the set of scan clock signal lines and the first carry clock signal line are electrically connected to the first stage circuit and the third stage circuit, and a second subset of the set of scan clock signal lines and the second carry clock signal line are electrically connected to the second stage circuit.

11. The display device of claim 10, wherein:

the second stage circuit is electrically connected to a line to which the first stage circuit is configured to output a first carry signal output; and the second stage circuit is electrically connected to a line to which the third stage circuit is configured to output a third carry signal output.

12. The display device of claim 10, wherein the gate driving circuit is disposed in a display panel on which the plurality of scan lines and the plurality of clock signal lines are disposed.

13. The display device of claim 10, wherein the first subset and the second subset do not overlap with one another.

14. A gate driving circuit comprising a plurality of stage circuits electrically connected to a plurality of clock signal lines and configured to output a plurality of scan signals and a plurality of carry signals, wherein the plurality of clock signal lines include eight scan clock signal lines and first and second carry clock signal lines, each of the plurality of stage circuits includes:

a buffer group configured to output one or more scan signals of the plurality of scan signals and one or more carry signal of the plurality of carry signals;

a logic part configured to control the buffer group during a display driving period for driving an image; and a sensing part configured to control the buffer group during a sensing driving period for sensing a characteristic value of a sub-pixel, the plurality of stage circuits include:

a (2n−1)th stage circuit electrically connected to a first set of four scan clock signal lines of the eight scan clock signal lines and the first carry clock signal line; and a (2n)th stage circuit electrically connected to a second set of four scan clock signal lines of the eight scan clock signal lines and the second carry clock signal line, a (2n+1)th stage circuit electrically connected to the first set of four scan clock signal lines of the eight scan clock signal lines and the first carry clock signal line, and n is a natural number that is one or more.

15. The gate driving circuit of claim 14, wherein:

the (2n)th stage circuit is electrically connected to a line to which the (2n−1)th stage circuit is configured to output a (2n−1)th carry signal; and the (2n)th stage circuit is electrically connected to a line to which a (2n+1)th stage circuit is configured to output a (2n+1)th carry signal.

16. The gate driving circuit of claim 14, wherein:

the (2n−1)th stage circuit is electrically connected to a line to which a (2n−2)th stage circuit is configured to output a (2n−2)th carry signal; and the (2n−1)th stage circuit is electrically connected to a line to which the (2n)th stage circuit is configured to output a (2n)th carry signal.

* * * * *